(12) United States Patent
Datta et al.

(10) Patent No.: US 12,248,815 B2
(45) Date of Patent: Mar. 11, 2025

(54) CLIENT-CONFIGURABLE RETENTION PERIODS FOR MACHINE LEARNING SERVICE-MANAGED RESOURCES

(71) Applicant: Amazon Technologies, Inc., Seattle, WA (US)

(72) Inventors: Ramyanshu Datta, Campbell, CA (US); Ishaaq Chandy, Bellevue, WA (US); Arvind Sowmyan, Seattle, WA (US); Wei You, Kirkland, WA (US); Kunal Mehrotra, Kirkland, WA (US); Kohen Berith Chia, Seattle, WA (US); Andrea Olgiati, Gilroy, CA (US); Lakshmi Naarayanan Ramakrishnan, Redmond, WA (US); Saurabh Gupta, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/642,668

(22) Filed: Apr. 22, 2024

(65) Prior Publication Data
US 2024/0272953 A1    Aug. 15, 2024

Related U.S. Application Data

(63) Continuation of application No. 17/482,276, filed on Sep. 22, 2021, now Pat. No. 11,995,476.

(51) Int. Cl.
*G06F 9/46* (2006.01)
*G06F 9/50* (2006.01)

(52) U.S. Cl.
CPC .......... *G06F 9/5038* (2013.01); *G06F 9/5022* (2013.01); *G06F 9/5055* (2013.01)

(58) Field of Classification Search
CPC ..... G06F 9/5038; G06F 9/5022; G06F 9/5055
See application file for complete search history.

(56) References Cited

U.S. PATENT DOCUMENTS

| | | | |
|---|---|---|---|
| 8,589,554 B2 | 11/2013 | Kelkar et al. | |
| 9,426,019 B1 | 8/2016 | Nagargadde et al. | |
| 10,102,480 B2 | 10/2018 | Dirac et al. | |
| 10,552,774 B2 | 2/2020 | Shih et al. | |

(Continued)

OTHER PUBLICATIONS

U.S. Appl. No. 17/482,272, filed Sep. 22, 2021, Ramyanshu Datta et al.

(Continued)

*Primary Examiner* — Gregory A Kessler
(74) *Attorney, Agent, or Firm* — Robert C. Kowert; Kowert, Hood, Munyon, Rankin & Goetzel, P.C.

(57) ABSTRACT

A post-task-completion retention period for which a computing resource is to be retained, without de-activating the resource, on behalf of a set of requesters of machine learning tasks is determined at a machine learning service. A first task, identified at the service prior to expiration of the retention period at a first computing resource at which a second task has completed, is initiated at the first computing resource. In response to obtaining an indication of a third task and determining that a threshold criterion associated with the retention period satisfies a criterion, the third task is initiated at an additional computing resource. The additional computing resource is de-activated after the third task completes, without waiting for the retention period to expire.

20 Claims, 15 Drawing Sheets

(56) References Cited

U.S. PATENT DOCUMENTS

| | | |
|---|---|---|
| 10,884,787 B1 | 1/2021 | Wagner et al. |
| 10,942,795 B1 | 3/2021 | Yanacek et al. |
| 11,010,188 B1 | 5/2021 | Brooker et al. |
| 2015/0220364 A1 | 8/2015 | Jackson |
| 2018/0060132 A1 | 3/2018 | Maru et al. |
| 2020/0412720 A1 | 12/2020 | Siefke et al. |
| 2020/0412825 A1 | 12/2020 | Siefker et al. |
| 2021/0042085 A1 | 2/2021 | Guttmann |
| 2021/0157645 A1 | 5/2021 | Yanacek et al. |
| 2021/0191782 A1 | 6/2021 | Ahmed et al. |

OTHER PUBLICATIONS

U.S. Appl. No. 17/482,276, filed Sep. 22, 2021, Ramyanshu Datta et al.
U.S. Appl. No. 18/066,950, filed Dec. 15, 2022, Sushant Bhatia, et al.

Model training experimentation phase 410 (e.g., re-train a model repeatedly with a few modifications to code or data)

Short-duration model training sequences 420 (e.g., on different subsets of a data set)

Iterative data pre-processing tasks 430 (e.g., feature extraction, data cleansing/ transformations, ...)

Batch inference task sequence 440 (e.g., execute trained model on different sets of input records)

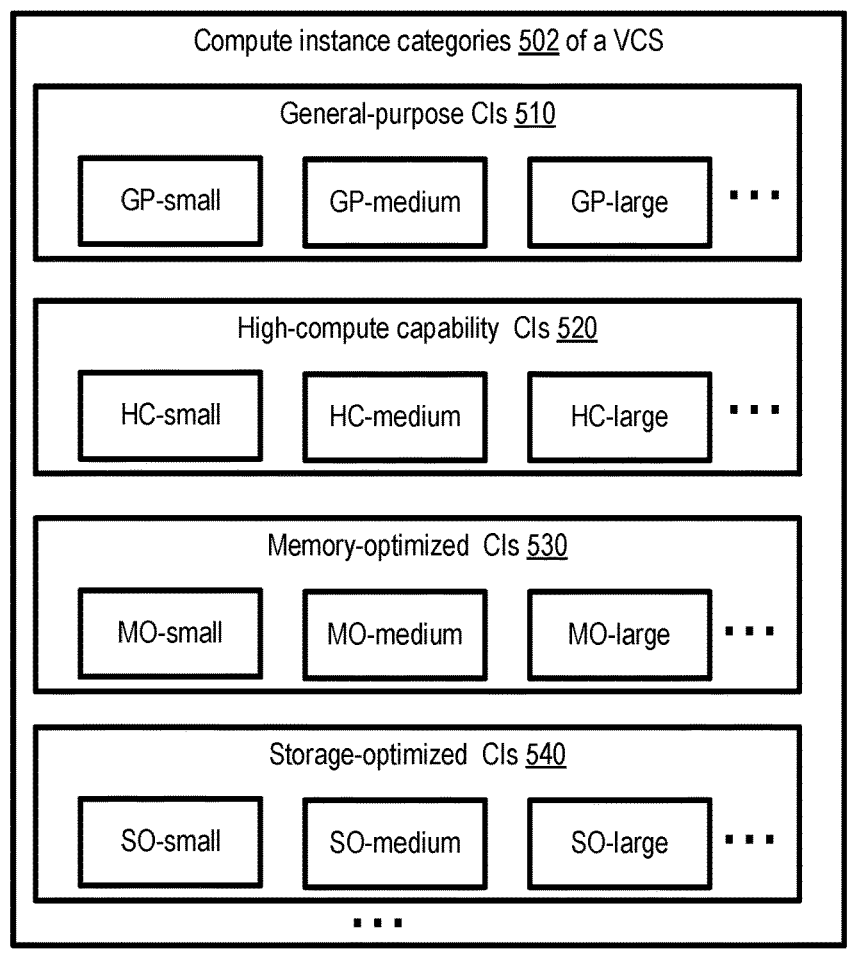
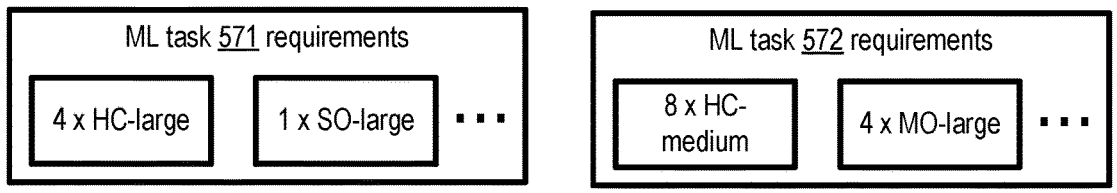
FIG. 5

```
┌─────────────────────────────────────────────────────────────────────────────┐
│ Authorized entities associated with client accounts of an MLS, on whose behalf compute instances │
│ from a warm pool W1 are assigned for ML tasks, opt in to receive notifications associated with task │
│ completions at W1's CIs, such as notifications of impending task completion and retention period │
│ initiation, notifications of imminent retention period expiration, etc.   1001 │
└─────────────────────────────────────────────────────────────────────────────┘
                                       │
                                       ▼
┌─────────────────────────────────────────────────────────────────────────────┐
│ MLS detects (e.g., using ML framework-dependent features/APIs) that an ML task implemented at a │
│                    CI of W1 is about to be completed   1004                 │
└─────────────────────────────────────────────────────────────────────────────┘
                                       │
                                       ▼
┌─────────────────────────────────────────────────────────────────────────────┐
│ If an entity has opted in to receive advance notifications of task completion, the MLS identifies the │
│ entity or entities and transmits such notifications, giving the entities some time to decide on whether │
│                    compatible tasks should be requested   1007              │
└─────────────────────────────────────────────────────────────────────────────┘
                                       │
                                       ▼
┌─────────────────────────────────────────────────────────────────────────────┐
│ If an entity has opted in to receive advance notifications of retention period expirations, and a time │
│ threshold (e.g., 50% of retention period of a CI is complete) is reached without receiving a task │
│ request that can be fulfilled using the CI, the MLS identifies the entity or entities and transmits such │
│ notifications; multiple such notifications may be transmitted at different stages of the retention period │
│ based on configurable parameters, giving the entities opportunities to take advantage of the reduction │
│ in preparatory configuration operation delays before the retention period expires and the CI is │
│                               terminated 1010                               │
└─────────────────────────────────────────────────────────────────────────────┘
```

*FIG. 10*

Authorized entity associated with client account of an MLS opts in to permit MLS to collect and analyze metrics/statistics associated with the executions of ML tasks at MLS-selected resources on behalf of the entity  1101

MLS collects data on tasks executed on behalf of the entity for some period of time (e.g., using computing resources that are configured within warm pools set up on behalf of the client, using computing resources that are not part of warm pools, or using either type of resource)  1104

MLS analyzes collected data, e.g., using one or more demand forecasting models or other ML models, and determines recommended warm pool configuration settings for the entity (e.g., settings for additional pools, or changes to existing pools' settings)  1107

MLS transmits recommended settings to entity 1110

FIG. 11

CLIENT-CONFIGURABLE RETENTION PERIODS FOR MACHINE LEARNING SERVICE-MANAGED RESOURCES

PRIORITY APPLICATION

This application is a continuation of U.S. patent application Ser. No. 17/482,276, filed Sep. 22, 2021, which is hereby incorporated by reference herein in its entirety.

BACKGROUND

Many modern computing applications employ machine learning algorithms and models. Deep learning models, which typically include numerous hidden neural network layers at which values of thousands (or even millions) of model parameters are learned, have been used with great in a wide variety of application domains including object recognition, text analysis, video analysis, game playing, time series prediction and the like. Some deep learning models, referred to as generative models, are even being used to synthesize music and other types of content. Often, sophisticated machine learning models can be trained and run efficiently on high-end computing resources managed by cloud-based machine learning services. For example, the data scientists or other users on whose behalf machine learning tasks are executed may not have to concern themselves with the details of acquiring specific computing resources; the cloud-based service takes care of acquiring resources suitable for the tasks, un-configuring the resources (and deleting any task-specific data sets from the resources) as soon as the tasks are completed. Preparing or configuring computing resources to execute the requested machine learning tasks may sometimes take a non-trivial amount of time.

BRIEF DESCRIPTION OF DRAWINGS

FIG. 4 illustrates example usage scenarios in which post-task-completion retention of compute instances at a machine learning service may lead to substantial performance benefits, according to at least some embodiments.

FIG. 5 illustrates example categories of compute instances offered by a virtualized computing service of a cloud provider network, various combinations of which may be utilized for individual machine learning tasks managed by a machine learning service, according to at least some embodiments.

FIG. 10 is a flow diagram illustrating aspects of operations that may be performed at a machine learning service to provide notifications associated with post-task-completion retention periods, according to at least some embodiments.

FIG. 11 is a flow diagram illustrating aspects of operations that may be performed at a machine learning service to generate recommendations for warm pool parameter settings, according to at least some embodiments.

Figure 1:
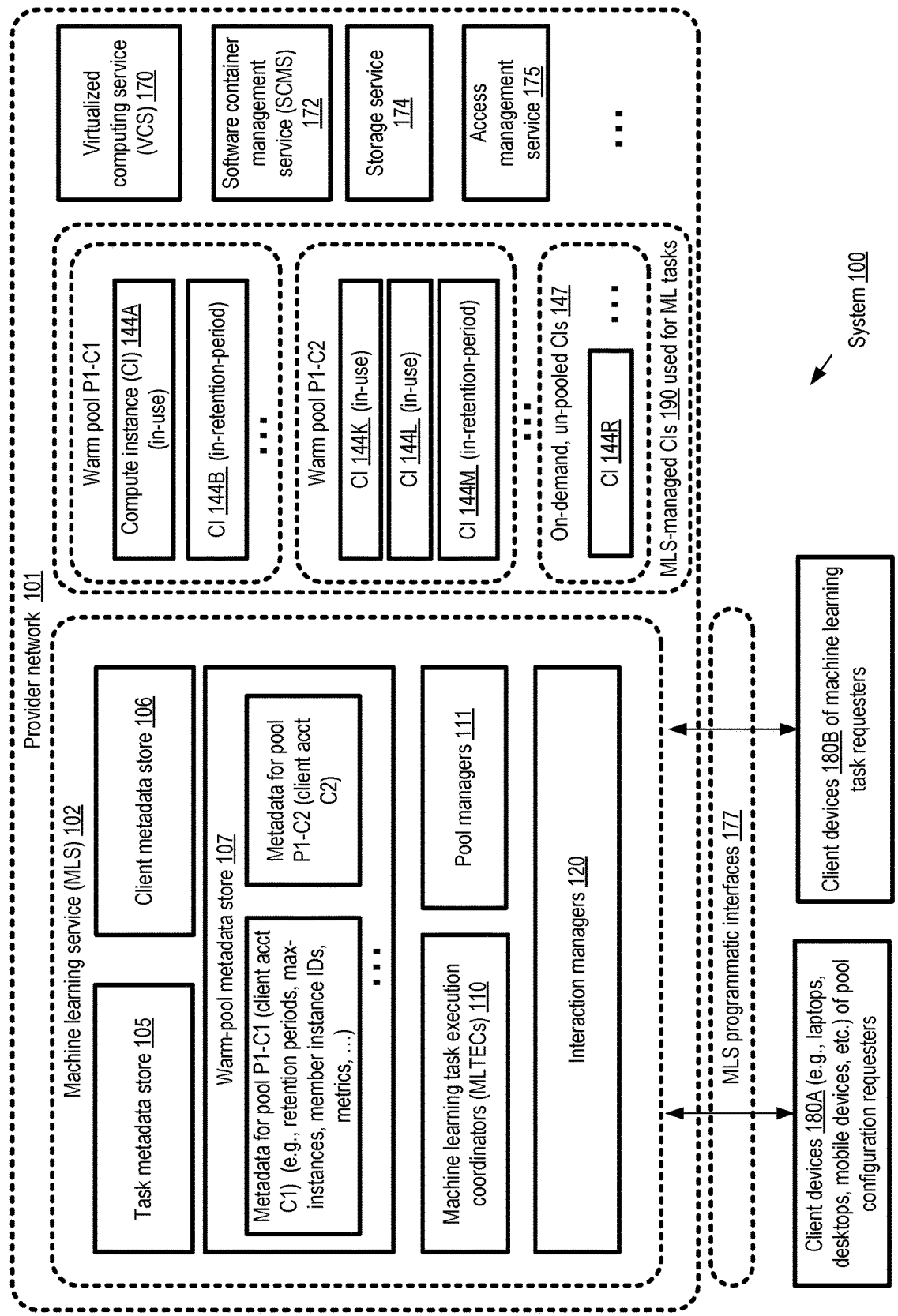
FIG. 1 illustrates an example system environment in which client-specified post-task-completion retention periods for computing resources managed by a machine learning service may be utilized to reduce startup overhead for machine learning tasks, according to according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for reducing, using client-specified parameters for retaining and re-using computing resources, configuration-related overhead associated with machine learning tasks (such as training of models) that are run at resources managed by a machine learning service (MLS) of a provider network. The MLS may provide interfaces enabling a user or client such as a data scientist to indicate various properties of a requested machine learning task: e.g., a software container comprising the executable logic or algorithm to be used, data sources from which any needed data sets can be obtained, and resource requirements for executing the task (e.g., that a model should be trained using one or more computing resources, such as compute instances of a particular category defined at a virtualized computing service (VCS)). The details of actually running the requested task may then be coordinated on behalf of the user by the MLS. The coordination-related work performed by the MLS may include, for example, acquiring or identifying one or more specific computing resources that satisfy the requirements indicated by the user, orchestrating preparatory configuration steps (if any such steps are needed) at the computing resources, obtaining one or more data sets if needed, causing the task to be executed using the specified algorithm at the computing resources, saving the results, performing any needed cleanup tasks (such as deleting data sets used for the task) and un-configuring or decommissioning the computing resource(s). The MLS may thus manage the resources and execution of machine learning tasks on behalf of its users, enabling the users to focus on their areas of expertise such as the design of improved machine learning algorithms instead of spending time on resource-related issues.

As suggested above, the preparatory steps that may have to be performed for some machine learning tasks may include, for example, launching or starting up a compute instance (e.g., a guest virtual machine) to be used for the task, downloading a software container image comprising code to be used to implement the algorithm used for the task, downloading data sets and the like. Depending on the particular type of task being performed, these steps may take a non-trivial amount of time. Furthermore, in some scenarios, some of the preparatory steps (or parts of the preparatory steps) may not be required at all. For example, if the same category of compute instance can be used for a series or sequence of model training experiments, with a few minor code changes or hyper-parameter changes between successive experiments, incurring the overhead of starting up a new compute instance for each training experiment, or re-downloading the entire data set, may not necessarily be worthwhile. At the same time, clients of an MLS may not wish to maintain a given compute instance used for a particular task indefinitely for a variety of reasons in various embodiments. For example, the data sets used for the task may comprise sensitive information; for data security reasons, the clients may wish to delete the data from memory and storage of a compute instance as soon as the data is no longer needed, which may involve terminating or shutting down the compute instance. Furthermore, in some cases, the longer a compute instance remains running on behalf of a client by the MLS, the higher the billing costs incurred by the client may become; as such, clients may wish to terminate execution of the compute instance as soon as it is no longer needed. Thus, a tradeoff may have to be made between the delays associated with preparatory configuration steps (which clients may wish to reduce for certain types of tasks, by keeping instances running longer) and the benefits of terminating compute instances sooner rather than later (such as potentially higher levels of data security, and lower costs).

According to various embodiments, an MLS may provide its clients with a flexible easy-to-use mechanism for managing such tradeoffs, in the form of configurable post-task-completion retention periods for the compute instances used for machine learning tasks requested by the clients. The MLS may provide programmatic interfaces enabling a client (such as an administrator associated with a client account of the MLS) to specify a set of parameters of a "warm pool" of compute instances that can be used and potentially re-used for tasks requested by a specified set of authorized users. Such parameters of a given pool may include, for example, the post-task-completion retention period (PRP), an upper limit on the number of concurrently-in-use compute instances of a particular instance category to which the PRP applies, and an indication of the set of authorized users or entities (all of which may be affiliated with the same client account) for whose task requests the compute instances of the pool can be used in some embodiments. Pool parameter values may be stored at a metadata repository of the MLS. The PRP may indicate a client-selected time interval (expressed in, for example, seconds, minutes or hours, or expressed as a fraction of the time taken for the completed task after which the PRP occurs) for which a given compute instance is not to terminated after the completion of a machine learning task. Instead, the given compute instance is to be kept alive or active for the PRP, in the event that a request for another task whose requirements can be satisfied using the instance is received from a user of the authorized set. If a request for such a task is received during a PRP of a particular compute instance of the pool, that task may be performed using that compute instance. Tasks requested by users that are not members of the authorized set of users of the warm pool may not be scheduled on instances of the pool in at least some embodiments, even if there is a compatible compute instance waiting for potential re-use (i.e., a compute instance whose PRP has begun but has not yet expired, and which belongs to the category needed for a task requested by a user who is not in the authorized set) in the pool. In effect, a compute instance within the pool may be kept reserved for the authorized users of the pool, but only for a configurable time period (the PRP) after a current task completes at the compute instance in such embodiments. After its PRP expires, a compute instance may be terminated, de-activated or un-configured in various embodiments.

Pools of compute instances of the kind described above may be referred to as "warm" pools as the compute instances retained in the pool may remain at least partially configured for re-use, instead of requiring a full reconfiguration or cold start before a new task can be performed. Warm pools may be used for a variety of machine learning tasks, including model training tasks, data pre-processing tasks, inference/prediction tasks and so on in different embodiments. In some embodiments, a compute instance within a given warm pool may be utilized for some combination of such tasks—e.g., the same compute instance may be used for data pre-processing, and the re-used for training and then inference.

A warm pool W1 whose parameters (instance category Cat1, maximum-in-use instances M1>0, authorized user set S1, and post-task-completion retention period PRP1) have been stored may then be utilized as indicating in the following simplified example in various embodiments. Initially, W1 may have no compute instances in it; that is, in at least some embodiments, compute instances may not be added to a warm pool until task requests requiring such instances are received. Assume that a task request R1 for a task T1 is received from a user who is a member of S1, and T1 requires one compute instance of category Cat1. Since W1 has no member compute instances to begin with, adding one instance of category Cat1 would not violate the M1 constraint on the maximum-in-use instances, so a new compute instance C1 may be launched and added as a member of W1 (that is, metadata indicating that C1 is part of W1 and that PRP1 applies to C1 may be stored). Preparatory configuration operations (e.g., including downloading an image containing algorithm code for T1, and/or downloading a data set for T1) may be performed for T1 on C1, and T1 may then be executed at C1.

Now assume that at some point after T1's execution on C1 is begun, a second task request R2 for a second task T2 is received from a member of S1. If T1 has completed and the PRP of C1 relative to T1's completion has not yet expired, C1 may be assigned to T2 in at least some embodiments. The overhead of starting up a new compute instance may thus be avoided for T2. If T2 does not require an image comprising code for a different algorithm (e.g., if the same algorithm is to be used for T2 as the one used for T1, or if just a few code changes which can be applied quickly to the algorithm are needed), the overhead of downloading an image with algorithm code may also be avoided for T2. If T2 does not require an entirely new data set (but can, for example, re-use the same data set that was used for T1, or only requires a few minor changes to the data set), the overhead of downloading a data set may also be avoided for T2. If T1 is still running at the time that R2 is received at the MLS, and if adding another compute instance to W1 would not violate the M1 limit, a new compute instance C2 may be added to W1 and used for T2. If the M1 limit would be violated by adding a compute instance, a new compute instance C3 which is not included as a member of W1 may be utilized for T2 in at least one embodiment; after T2 is completed on C3, C3 may immediately be terminated (as W1's PRP setting does not apply to C3) in at least some embodiments.

As one skilled in the art will appreciate in light of this disclosure, certain embodiments may be capable of achieving various advantages, including some or all of the following: (a) reducing the overall amount of computational, storage, memory and networking resources utilized for performing machine learning tasks such as training, data preprocessing and inference/prediction, (b) shortening the time taken to obtain high-quality inference results from models trained at machine learning services, and/or (c) improving the user experience of data scientists whose machine learning tasks are implemented using resources managed by machine learning services, e.g., by avoiding or shortening delays between successive tasks.

According to some embodiments, a system may comprise one or more computing devices. The computing devices may include instructions that upon execution on or across the computing devices cause, by a machine learning service (MLS), a first machine learning task (MLT) to be performed at a first compute instance (CI) of a virtualized computing service (VCS). The first compute instance may, for example, belong to a first category of several computing resource categories which can be utilized on behalf of clients of the VCS. The first CI may be utilized and/or selected for the first MLT by the MLS in response to a first task request from a requester of a set of requesters in at least some embodiments. The first task request may not specify that the first CI is to be used for the first MLT. Metadata stored by the MLS in various embodiments may indicate that (a) execution of the first CI is not to be terminated during a post-task-completion retention period (PRP) after a task performed at the first CI is completed, and (b) the first CI is not to be used for a task which has been requested by a requester that is not a member of the first set of requesters.

The MLS may cause a second MLT to be performed at the first CI after the first MLT is completed in at least some embodiments. An indication of the second MLT may be obtained from a requester of the first set of requesters before an expiration of the PRP relative to completion of the first MLT. The request for the second MLT may not specify that the first CI is to be used for the second MLT in some embodiments.

In response to (a) obtaining a request for a third MLT at the MLS from a requester of the first set of requesters and (b) determining that a number of in-use compute instances to which the PRP applies satisfies a criterion, the third MLT may be caused to be performed at a second CI of the VCS in various embodiments. After the third MLT is completed, the second CI may be terminated by the MLS without waiting for a corresponding PRP to expire.

In at least one embodiment, CIs with associated PRPs may be utilized to perform a set of related machine learning experiments, such as training and then iteratively re-training one or more models, where the models may be re-trained after changing one or more configuration settings or making a minor modification to a portion of software used for the training. In some embodiments, the same data set, or a slightly modified version of a data set, may be used for successive tasks performed at the same CI. In other embodiments, after a CI is selected for re-use for a second MLT during a PRP, a different data set may be downloaded for the second MLT by the MLS, e.g., from a data source indicated in the request for the second MLT.

In some embodiments, an authorized user of an MLS may submit a multi-task descriptor or a bulk task request in a single application programming interface (API) invocation or a single message. The multi-task descriptor may describe or provide the properties of several different requested MLTs, and some or all of the MLTs may be executed using a single CI to which a PRP applies. In such a scenario, as soon as one task indicated in the multi-task descriptor completes at the CI, another task indicated in the descriptor may be initiated before the PRP expires. In at least one embodiment, a multi-task descriptor may indicate whether its tasks have to be run in a particular sequence or can be run at least partly in parallel, enabling the MLS to schedule the tasks appropriately.

According to one embodiment, a user of an MLS may opt-in to receive recommendations for PRP values and/or other related configuration settings from the MLS, based on analysis of various metrics to which the user has granted the MLS access. The MLS may collect the metrics for various tasks requested by the user (or other users affiliated with that user) and performed at the MLS, analyze the metrics, and then present a recommended range or value of a PRP that the client can specify for future task executions.

In one embodiment, for example after a user opts-in for notifications, an MLS may utilize a programmatic interface to present an advance notification to the user of one or more of: (a) a time at which a PRP at a particular computing resource (such as a CI) being utilized for a task requested by the user is going to be initiated or (b) a time at which a PRP at a particular computing resource is going to end. Such advance notifications may, for example, help the user to request compatible tasks before the PRP at the computing resource expires.

In various embodiments, an MLS may collect various metrics pertaining to the use of PRPs, such as the number of times a PRP for a computing resource of a pool of computing resources set up on behalf of a set of authorized entities expired before the corresponding computing resource could be re-used, measures of the reduction in preparatory configuration-related delays obtained using PRPs, the average times taken between a submission of a task request and the start of execution of the algorithms for various tasks (such times may be reduced by using PRPs for related sequences of tasks), and so on.

According to some embodiments, a system may comprise one or more computing devices. The computing devices may include instructions that upon execution on or across the computing devices cause the one or more computing devices to store, at an MLS of a provider network, in response to a pool establishment request, a set of parameters of a warm pool of compute instances to be assigned for MLTs requested by one or more entities of a first set of entities. The set of parameters may include a maximum number of CIs of a first category of compute instances of a computing service of the provider network which are to be included in the pool concurrently. The computing service may provide compute instances of a plurality of categories, which differ from one another in various properties such as a performance capacity with respect to a particular type of resource. The parameters may also include a PRP in various embodiments during which, after completion of an MLT at a CI of the first category within the pool, a data set accessed by the completed MLT at the CI is to be retained at the CI by the MLS.

The MLS may assign a first CI to a first MLT indicated in a first task request from an entity of the first set of entities in various embodiments. The first CI may belong to the first category and may be configured as a member of the pool. The first task request may not specify a CI to be used for the first MLT in at least some embodiments. In one embodiment, assignment of the first CI to the first MLT may be based at least in part on a determination that (a) a total number of in-use CIs of the first category within the pool does not exceed the maximum number, (b) one or more networking configuration settings of the first CI satisfy a networking requirement indicated in the first task request, and (c) the PRP of the first CI, relative to a completion of an earlier MLT at the first CI, has not expired. A result of the first MLT, obtained at the first CI, may be stored.

According to at least some embodiments, a given pool of compute instances established in respond to a client request may include computing resources of several different categories, where the resources in the different categories have different resource capacities (e.g., different numbers of virtual or physical CPUs, different amounts of memory or storage space, different networking capacity, etc.). Respective sets of parameters may be specified in a pool establishment request for each of the categories of computing resources.

In some embodiments, a pool establishment request may be submitted prior to the submission of any task requests which can be satisfied using computing resources of the pool. In at least one such embodiment, computing resources may only be assigned to the pool after the corresponding task requests are received. That is, in such embodiments, the properties of the pool may be stored before the pool is populated with resources; metadata indicating that a computing resource is a member of the pool may only be stored at an MLS after the task request for which the computing resource is selected is received. In other embodiments, a pool may be pre-populated with one or more computing resources as soon as the pool establishment request is received.

The MLS may be responsible for managing software updates (e.g., operating system upgrades or patches) at the computing resources of various warm pools established on behalf of clients in some embodiments. In response to determining (e.g., based on information accessed from a computing service) that a software upgrade is available for a particular computing resource included in a warm pool, the MLS may cause the software upgrade to be applied to the particular computing resource without receiving a request for the upgrade from an entity on whose behalf the pool was established.

In some embodiments, when selecting a computing resource of a pool for a particular requested task, when the PRP of the computing resource has not yet expired after an earlier task was completed, a number of configuration settings of the computing resource may be examined to verify that they satisfy the requirements of the particular requested task. Such configuration settings (held over or retained at least temporarily from the time period when the previously-executed task was executed) may include, for example, (a) an indication of a membership of the computing resource within an isolated virtual network, (b) a security setting, (c) a storage resource setting, or (d) a networking performance setting. An isolated virtual network (IVN) may comprise a collection of networked resources (including, for example, compute instances) allocated to a given client account of a virtualized computing service (VCS), which are logically isolated from (and by default, inaccessible from) resources allocated for other client accounts in other isolated virtual networks. Authorized entities (e.g., users) associated with the client account on whose behalf an IVN is established may be granted substantial flexibility regarding network configuration for the resources of the IVN—e.g., private IP addresses for compute instances may be selected by an entity without having to consider the possibility that other resources within other IVNs may have been assigned the same IP addresses, subnets of the entity's choice may be established within the IVN, security rules may be set up by the entity for incoming and outgoing traffic with respect to the IVN, and so on.

An authorized user of an MLS may change some of the parameters of a warm pool (which was established earlier with an initial set of parameters) by submitting a programmatic request in various embodiments. For example, the limits on resource counts may be changed, the PRP may be changed, or the set of users whose task requests can be fulfilled using the pool may be changed. When a PRP change is requested, a number of options may be available with respect to how/when the requested PRP change should be applied. For example, should the change be applied only to new computing resources added to the pool after the change request, or should it be applied to currently in-use resources as well? Should the change be applied to computing resources that are currently in their PRPs? In at least some embodiments, in addition to allowing authorized users to change PRPs, an MLS may also allow the users to specify policies to be used to implement requested PRP modifications; such policies may for example provide answers to the kinds of questions listed above regarding how/when the PRP changes should be applied.

As described above, computing resources (such as CIs) that are configured as members of warm pools may be used for MLT requests without incurring some types of overheads associated with preparatory configuration operations. For other MLT requests, the MLS may determine that a warm pool is not to be used—e.g., because an appropriate warm pool has not been established for the entity from which the MLT request is received, or because the limit on maximum number of in-use computing resources has been reached, and so on. In such scenarios, the MLS may coordinate the execution of the preparatory configuration operations at a compute resource which is not designated as a member of a warm pool—e.g., data sets may be downloaded, a machine image comprising algorithm code may be downloaded, and so on.

In at least some embodiments, as indicate above, an MLS and/or a VCS whose computing resources are utilized for MLTs by an MLS may be implemented as part of a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include a VCS, an MLS, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, or a cloud compute service). This service may offer compute instances of the kind discussed above (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance categories, types or families. An instance type may be characterized by its hardware type, computational resources (e.g., number, type, and configuration of central processing units (CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type, as discussed below in further detail. A suitable host for a requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application (e.g., an application involving training or executing a machine learning model) that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane, and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which client-specified post-task-completion retention periods for computing resources managed by a machine learning service may be utilized to reduce startup overhead for machine learning tasks, according to according to at least some embodiments. As shown, system 100 comprises resources and artifacts of several network-accessible services of a provider network 101, including a machine learning service (MLS) 102, a virtualized computing service (VCS) 170, a software container management service (SCMS) 172, a storage service 174 and an access management service 175.

The MLS 102 may implement a set of programmatic interfaces 177, which can be utilized by several classes of entities or users to submit requests pertaining to machine learning tasks from client devices 180A or 180B (such as laptops, desktops, mobile computing devices etc.) and to receive corresponding responses in the depicted embodiment. Programmatic interfaces 177 may, for example, include one or more web-based consoles, a set of application programming interfaces (APIs), command-line tools, graphical user interfaces and the like. The requests and messages submitted via programmatic interfaces 177 may initially be received at a set of interaction managers 120 in the depicted embodiment. The interaction managers 120 may perform initial processing of the received request (e.g., including parsing the request contents), and then pass on internal versions of the requests to the appropriate other subcomponents of the MLS 102, such as pool managers 111 or machine learning task execution coordinators (MLTECs) 110. The MLTECs, pool managers and interaction managers, as well as other MLS subcomponents shown in FIG. 1, may each be implemented using some combination of hardware and software of one or more computing devices in various embodiments.

Pool configuration requesters may use client devices 180A to submit requests to configure or establish warm pools of compute instances (CIs) of the VCS 170 to be used for executing machine learning tasks in the depicted embodiment. A pool establishment request may indicate various properties or parameters of a warm pool of CIs, such as the categories of CIs to be included in the pool, the maximum number of concurrently-in-use CIs of each category to be included in the pool, the post-task-completion retention periods (PRPs) for the CIs of each category, the set of machine learning task requesters for whose task requests the pool's CIs can be used, and so on. Such properties or parameters may be stored as part of warm-pool metadata store 107 by pool managers 111 in the depicted embodiment. For example, warm-pool metadata store 107 comprises metadata for pool P1-C1 set up for users associated with a client account C1 of the MLS, as well as metadata for pool P1-C2 (set up for users associated with a client account C2). A PRP applicable to a given CI or a given category of CIs included in the pool may indicate the time period, after a completion of a requested machine learning task at the CI, the CI is to be kept running or operational, without deleting the data sets used by the completed task, and without making changes to various configuration settings including networking-related, security-related and storage-related settings. If the requirements of an additional yet-to-be-initiated machine learning task of an authorized requester can be satisfied at a CI of the pool, and the additional task is identified before the PRP of the CI expires, that additional task may be scheduled (e.g., by an MLTEC 110) at the CI, thus avoiding or reducing the amount of time that would have been required for one or more preparatory configuration operations. If a compatible additional task is not found before a PRP of a CI expires, that CI may be terminated, e.g., such that the data and configuration settings that were stored at the CI are no longer accessible in various embodiments.

In the embodiment depicted in FIG. 1, the MLS may manage computing resources such as CIs that are utilized for machine learning tasks submitted by requesters associated with numerous client accounts such as C1 and C2. Information about the client accounts (e.g., which task requesters can utilize warm pools set up for a given client account) may be stored within client metadata store 106, and/or at an access management service 175 in the depicted embodiment. The task requesters may use programmatic interfaces 177 to submit descriptors of their tasks, such as the quantity and categories of CIs needed for a given task, the algorithms to be executed, the data sets to be processed etc. The task properties may be stored within task metadata store 105. The MLS may acquire/assign specific CIs for the tasks, coordinate any preparatory configuration steps needed, cause the data sets to be downloaded if needed, cause the task algorithms to be executed at the CIs, store or transmit results of the tasks if needed, scrub memory and storage to delete data sets if needed, and terminate execution of the CIs in at least some embodiments. Software containers comprising executable and/or source code to be used for the algorithms may be downloaded, for example, from SCMS 172 to the CIs by the MLTECs in some embodiments. Data sets may be downloaded to the CIs by the MLTECs from storage service 174 if needed, and results of the tasks executed at the CIs may be stored after being transmitted by the MLTECs from the CIs to the storage service 174 if needed. The task requests, submitted by authorized requesters via the interfaces 177, may not have to specify the specific compute instances to be used for the tasks in various embodiments; instead, the requesters may rely upon the MLS to choose the appropriate computing resources for the task, given the requirements indicated in the task requests. In some embodiments, users of the MLS may not be provided details (e.g., including identifiers) of the specific CIs used for their tasks.

MLS-managed CIs 190 used for ML tasks requested by authorized requesters may be organized into a set of warm pools and a set on on-demand, un-pooled CIs (i.e., CIs that are not configured as members of the warm pools). At a given point in time, a warm pool may comprise zero or more CIs that are in use (currently running tasks), and zero or more CIs that are in their respective retention periods (i.e., being retained for possible re-use for the specified post-task-completion retention period after a previous task has completed). For example, warm pool P1-C1 set up for client account C1 comprises in-use CI 144A and in-retention-period CI 144B, while warm-pool P1-C2 set for client account C2 comprises in-use CIs 144K and 144L and in-retention-period CI 144M. For task requests that cannot be fulfilled using a warm pool, an MLTEC may acquire CIs from the VCS on-demand, use the CIs for the tasks, and then terminate the CIs immediately after the tasks complete, without waiting for a post-task-completion retention period to expire. Such CIs may not be designated as members of a warm pool in the depicted embodiment. On-demand, un-pooled CIs 147 include an in-use CI 144R in the scenario shown in FIG. 1.

Figure 2:
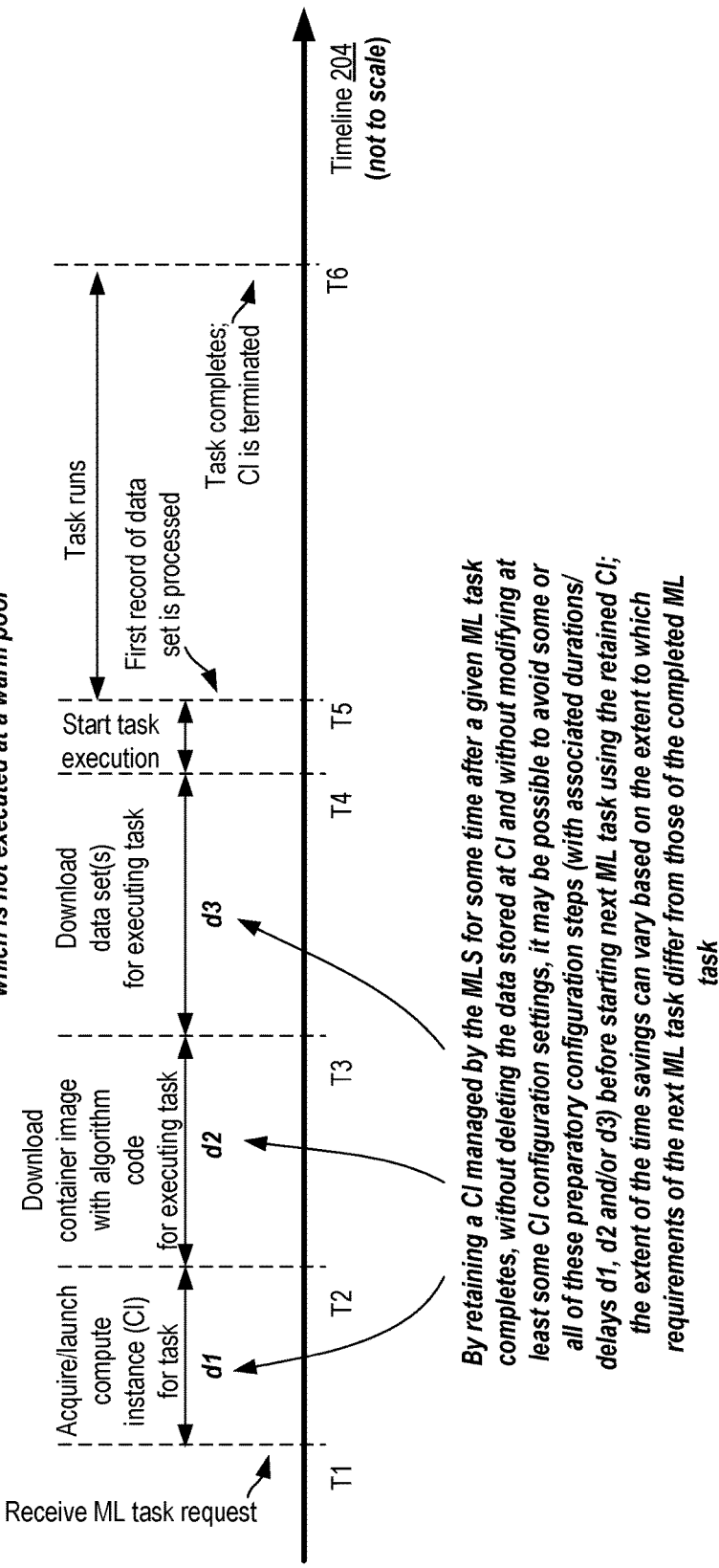
FIG. 2 illustrates an example event sequence associated with a machine learning task executed at a machine learning service, indicating some preparatory configuration-related operations which may be avoided using post-task-completion retention periods, according to at least some embodiments.

FIG. 2 illustrates an example event sequence associated with a machine learning task executed at a machine learning service, indicating some preparatory configuration-related operations which may be avoided using post-task-completion retention periods, according to at least some embodiments. The events of an example conventional event sequence 210 for a machine learning (ML) task such as a training task for a machine learning model, implemented using resources managed by an MLS similar to MLS 102 of FIG. 1 but without using a warm pool, are shown along timeline 204. Note that the relative times taken for various stages of the event sequence are not to scale, i.e., they may not represent the relative amounts taken for analogous tasks in real-world scenarios; the events are shown to illustrate the concepts involved, and do not necessarily reflect measurements from actual implementations.

At time T1 along timeline 204, a request for an ML task is received at the MLS. A compute instance (CI) is acquired and/or launched by the MLS between T1 and T2 (a duration of d1 seconds). During the d2 seconds that elapse between T2 and T3, a software container image comprising code for executing the requested task may be downloaded (e.g., in response to commands issued/coordinated by the MLS) to the CI from a service or storage location indicated in the request in the depicted example scenario. In d3 seconds between T3 and T4, one or more data sets (e.g., training data examples in the case of a training task) may be downloaded (e.g., also in response to commands issued/coordinated by the MLS) from a storage location indicated in the request. (Note that in some cases, it may be possible to download the container image at least partially in parallel with the data sets.) At approximately T4, the execution of the task's algorithm may be started, and the first data of the data set(s) may be processed at T5 by the algorithm. The task may run until T6, at which point the task completes and the CI used for the task is terminated or deactivated.

The preparatory configuration operations performed between T1 and T4 may in some cases take a non-trivial amount of time, e.g., relative to the task's execution time and/or in absolute terms. By retaining a CI managed by the MLS for some time after a given ML task completes, without deleting at least part of the data stored at the CI (since the data itself may be re-usable), and without modifying at least some configuration settings (since the configuration settings may also be appropriate for a subsequent task), it may be possible to avoid some of all of the preparatory configuration steps for a subsequent ML task at the same CI. This insight provides at least part of the motivation behind the use of post-task-completion retention periods and warm pools of the kind introduced above. The extent of the time and resource savings obtained may vary, based on factors such as the extent to which the requirements (e.g., data set requirements, algorithm change requirements, etc.) of the subsequent ML task differ from those of the completed ML task.

Figure 3:
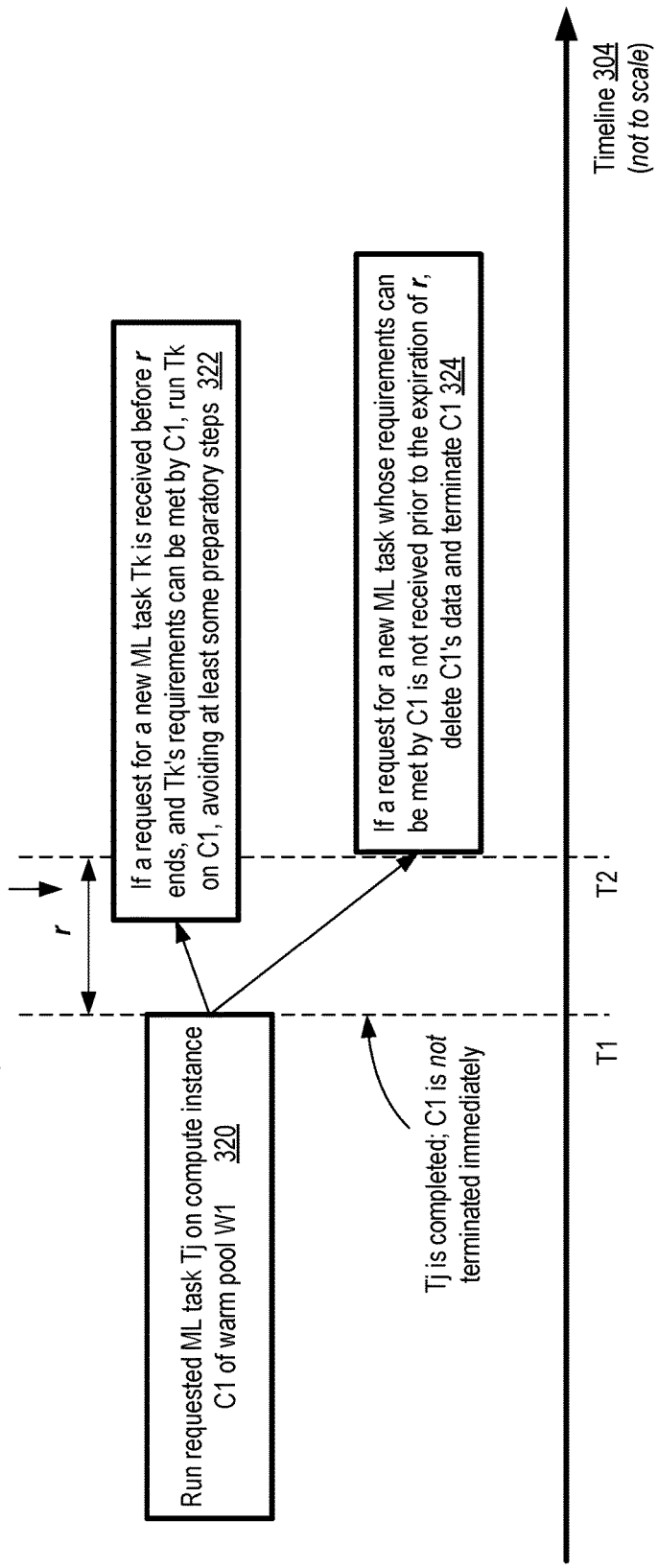
FIG. 3 illustrates an example re-use of a compute instance for a machine learning task for which a request is received during a post-task-completion retention period of an earlier-executed machine learning task, according to at least some embodiments.

FIG. 3 illustrates an example re-use of a compute instance for a machine learning task for which a request is received during a post-task-completion retention period of an earlier-executed machine learning task, according to at least some embodiments. For some period of time ending at T1 along timeline 304, a requested ML task Tj is run on a compute instance C1 which is designated as a member of a warm pool W1, as indicated in element 320.

At T1, Tj is completed (as may be determined using task completion criteria indicated in the request for Tj), but C1 is not terminated immediately. Instead C1 is retained for up to a post-task-completion retention period r after T1 (with r scheduled to end at T2) in the depicted embodiment. At least some processes of C1 remain running, data sets stored at C1 are not deleted, and at least some of C1's configuration settings (such as networking-related settings, security settings governing inbound and outbound network traffic, storage access settings, etc.) are not changed during the retention period.

If a request for a new ML task Tk is received before r ends, and Tk's requirements can be satisfied by C1, Tk may be run on C1 (as shown in element 322), thus avoiding some of the overhead associated with preparatory configuration operations of the kind discussed earlier. In contrast, if a request for a new ML task whose requirements can be met by C1 is not received prior to the expiration of r, C1's data may be deleted/scrubbed (e.g., to ensure that any subsequent CI to which the memory and storage which being used for Tj's data is assigned cannot access the data) and C1 may be terminated in the depicted embodiment (element 324). Note that the request for Tk need not necessarily be received only after T1 in the scenario shown in FIG. 3; in some cases, a bulk task descriptor indicating several different tasks requested by the same requester may be received in a single message, and Tj and Tk may both be indicated in a single such descriptor.

As indicated in the context of FIG. 2, the extent of the time savings and/or resource savings obtained as a result of using warm pools of compute instances with user-selected post-task-completion retention periods may vary. FIG. 4 illustrates example usage scenarios in which post-task-completion retention of compute instances at a machine learning service may lead to substantial performance benefits, according to at least some embodiments. For some types of machine learning applications, the process of training the models used may include a model training experimentation phase 410. In such an experimentation phase, a set of models may be re-trained several times after making a few changes to the model code, data sets, and/or configuration settings, without requiring substantive changes to the execution environment being used. The changes may be small enough that downloading entire data sets and/or entire images containing algorithm code may not be required.

Another common scenario in which warm pools may be extremely beneficial is short-duration model training sequences 420, in which different models may be trained relatively quickly, e.g., on different subsets of a data set which has already been stored at the compute instance being used (or which can be streamed to the compute instance). In some cases, the subsets may be chosen deterministically from a larger data set, while in other cases, the subsets may be selected randomly, e.g., using pseudo-random number generators accessible at the compute instance. If the training of the model only takes a few seconds, for example, and the preparatory configuration steps take close to the same number of seconds, the overhead of the preparatory steps may be unacceptably high from the perspective of the training task requesters.

In some cases, respective machine learning tasks of a sequence of tasks may comprise iterative data pre-processing tasks 430 (e.g., comprising data cleansing/transformations, one or more stages of feature extraction, etc.). Such tasks may also benefit from the use of warm pools, as the configuration settings and computational capacity required for multiple tasks of the sequence may not differ much from one another.

Warm pools of the kind introduced above may also be extremely beneficial for batch inference task sequences 440, in which for example the same trained model may be executed for different groups of input records. For such tasks also, the computational requirements and configuration settings may not change much between successive tasks, and as a result substantial savings of time and resources may be obtained if warm pools with PRPs selected by MLS clients are utilized. Warm pools with configurable PRPs may also be beneficial for a variety of usage scenarios not shown in FIG. 4

FIG. 5 illustrates example categories of compute instances offered by a virtualized computing service of a cloud provider network, various combinations of which may be utilized for individual machine learning tasks managed by a machine learning service, according to at least some embodiments. In the embodiment shown in FIG. 5, compute instance categories 502 of a VCS may be organized as a number of category families: general-purpose CIs 510, high-compute capability CIs 520, memory-optimized CIs 530, storage-optimized CIs 540 and the like. Within a given family, multiple CI categories may be defined. CIs of a given CI category may differ in various properties, such as performance capacities with respect to computation, memory, storage and the like, from CIs of other categories within the same family as well as categories in different families.

Categories of the general-purpose CIs 510 family, intended for use by VCS clients for most types of applications which are not expected to have extremely high requirements for any particular type of resource, may include GP-small, GP-medium and GP-large in the depicted embodiment. The number of virtual CPUs assigned to a GP-large CI being greater than the number of virtual CPUs assigned to a GP-medium CI, and the number of virtual CPUs assigned to a GP-medium CI being greater than the number of virtual CPUs assigned to a GP-small CI. The amount of main memory assigned to a GP-large CI may also be greater than the amount of main memory assigned to a GP-medium CI, and the amount of main memory assigned to a GP-medium CI being greater than the number of virtual CPUs assigned to a GP-small CI. As such, GP-large CIs may be suited to more resource intensive applications than GP-medium CIs, and GP-medium CIs may be suited to more resource intensive applications than GP-small CIs.

As suggested by the name, high-compute capability CIs 520, such as HC-small, HC-medium and HC-large CIs, may be appropriate for applications whose computational needs are high. CIs belonging to the high-compute family may, for example be instantiated on virtualization servers which have higher-end CPUs and/or GPUs (graphics processing units) than are used for the general-purpose family. Memory-optimized CIs 530 such as MO-small, MO-medium and MO-large CIs may be suited for applications which have very high memory requirements relative to computational requirements or persistent storage requirements. Storage-optimized CIs 540 such as SO-small, SO-medium and SO-large CIs may be suited for applications which have very high persistent storage requirements relative to computational requirements or main memory requirements. Within each family, the performance capacity of the "large" CI category with respect to one or more types of resources (e.g., virtualized or physical CPUs, virtualized or physical GPUs, main memory, or storage) may exceed the corresponding performance capacities of the "medium" CI category, and the performance capacities of the "medium" CI category may exceed the corresponding performance capacities of the "small" CI category.

A given machine learning task, such as the training of one or more models or the pre-processing of data sets, may require one or more CIs of one or more of the categories 502 in the depicted embodiment. The particular combination of CIs which are expected to work well for a task may be determined, for example, by the data scientist(s) responsible for designing or selecting the algorithms used for the task in at least some embodiments. The data scientists may use their experience with earlier similar machine learning tasks, or conduct a few experiments, to determine the proposed computing resource requirements for a new task. Multiple CIs (rather than a single CI) may be appropriate for a given ML task, e.g., depending on the extent of parallelism supported by the algorithm, or the set of stages of a pipeline of operations executed for the task. In the example scenario shown in FIG. 5, requirements for an ML task 571 may include 4 HC-large CIs and 1 SO-large CI, while requirements of a different ML task 572 may comprise 8 HC-medium CIs and 4 MO-large CIs. Such requirements may be indicated in task requests submitted via the programmatic interfaces of the MLS in various embodiments.

Figure 6:
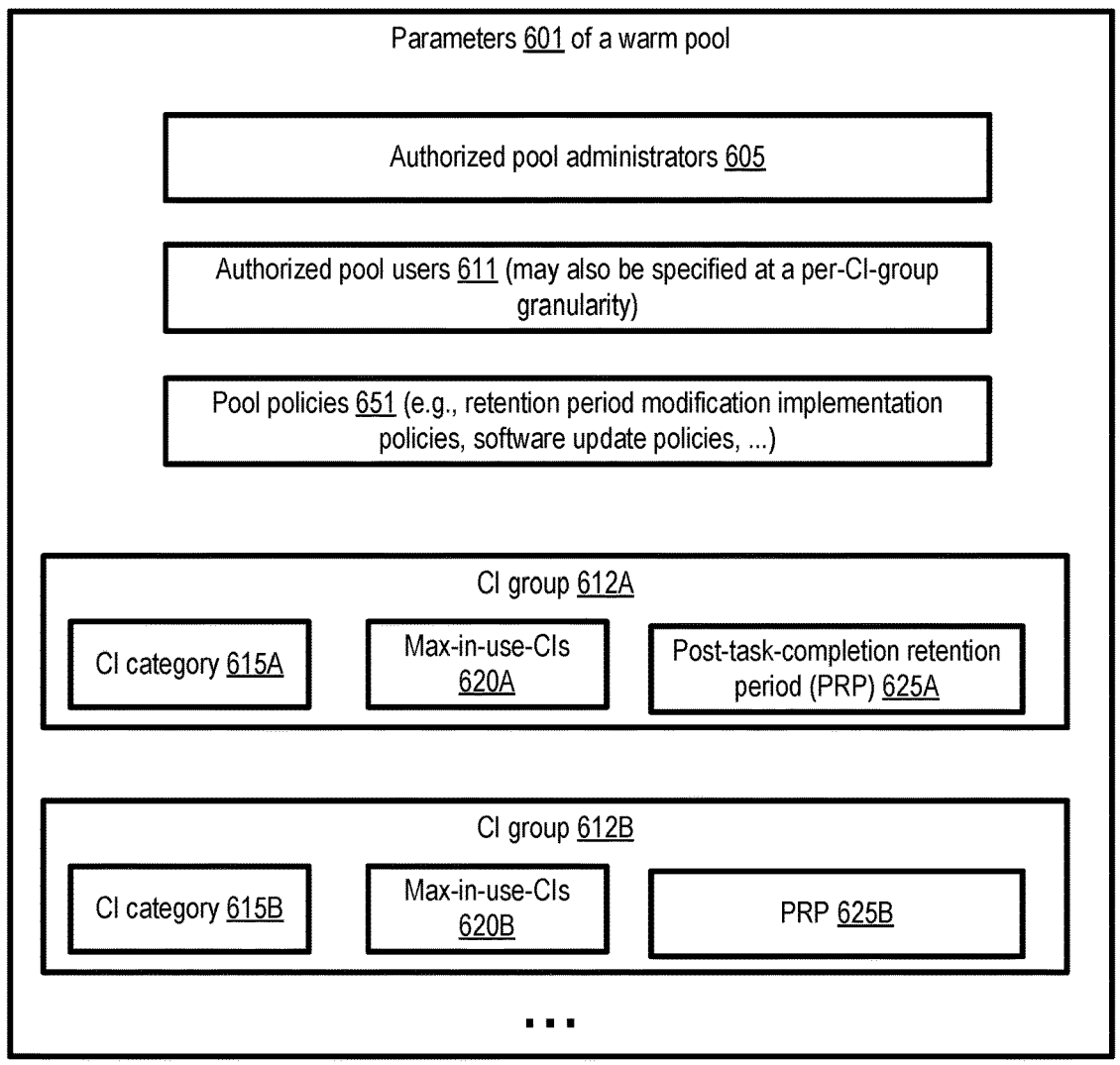
FIG. 6 illustrates example parameters of a warm pool of compute instances which may be established by a machine learning service for machine learning tasks requested by a set of users, according to at least some embodiments.

As described above, in various embodiments, one or more warm pools of compute instances may be set up in response to requests from clients of an MLS to reduce the overhead of preparatory configuration operations for machine learning tasks in various embodiments. FIG. 6 illustrates example parameters of a warm pool of compute instances which may be established by a machine learning service for machine learning tasks requested by a set of users, according to at least some embodiments. As shown, parameters 601 of a given warm pool established by an MLS may include identifiers of an authorized set of pool administrators 605 (e.g., entities permitted to modify some or all of the parameters 601), as well as identifiers of authorized pool users 611 on whose behalf compute instances of the pool are to be assigned to task requests submitted by the users in the depicted embodiment. An authorized user may also be designated as an authorized administrator in some embodiments. The authorized pool administrators as well as authorized users (all of whom may collectively be associated with a client account for which billing costs are computed at the MLS) may collectively be referred to as clients or client entities of the MLS in some embodiments. In some embodiments, instead of including specific user identifiers in the pool parameters for administrators and/or users, other metadata or rules that can be utilized to determine whether a source of a message directed to the MLS is an authorized administrator or authorized users may be included in the pool parameters—for example, roles and/or capabilities defined by an access management service and assigned to users may be used.

Definitions of one or more compute instance groups, such as CI groups 612A and 612B may be included within parameters 601 in some embodiments. In one such embodiment, corresponding (and potentially different) sets of authorized users may be indicated for individual ones of the CI groups. A given CI group may indicate a CI category (e.g., one of the categories indicated in FIG. 5), an upper limit on the number of concurrently in-use CIs of that category (max-in-use-CIs) and a post-task-completion retention period (PRP) for the CIs of the group. Thus, in the example scenario shown in FIG. 6, CI group 612A is to include up to max-in-use-CIs 620A as concurrent warm pool members of CI category 615A, and a CI of group 612A is to be retained for PRP 625A after any given ML task completes at that instance without terminating the instance or modifying/deleting its configuration settings or data sets. Similarly, CI group 612B is to include up to max-in-use-CIs 620B as concurrent warm pool members of CI category 615B, and a CI of group 612B is to be retained for PRP 625B after any given ML task completes at that instance without terminating the instance or modifying/deleting its configuration settings or data sets. In at least some embodiments, a max-in-use-CIs limit may apply to the CIs on which ML tasks are currently being run, as well as to CIs which are in their retention period. For example, in such an embodiment, if max-in-use-CIs is set to 10 for CI group 612A, and at a given point in time T1 there are ML tasks running on 8 CIs of CI group 612A, and 2 CIs of CI group 612A are in their PRPs but do not have tasks running, this means that the limit of 10 CIs has been reached and no more CIs can be added at time T1 to CI group 612A.

In some embodiments, the same PRP may be indicated by a client for all CIs of the warm pool, i.e., a PRP may be specified as a pool-level parameter rather than a CI group-level parameter. In one embodiment, a default PRP may be defined for the pool as a whole, and CI group-specific PRP parameter settings may be used to override the default if desired. The max-in-use-CIs parameter may represent one example of a threshold criterion associated with a PRP and a set of authorized pool users, which can be used to decide how to respond to a machine learning task request—e.g., whether to use a CI from within a warm pool or a CI which is not designated as a member of the warm pool. In other embodiments, other threshold criteria may be used—e.g., instead of limiting the maximum number of concurrently-in-use CIs, an upper limit on the number of times that the PRPs of CIs of a CI group have expired within a time interval, without the corresponding CI having been re-used for an additional task, may be used as the criterion for deciding whether another CI with a PRP should be added to a warm pool or not.

In some embodiments, the parameters 601 may include one or more pool policies 651, which provide guidance to the MLS regarding details of how some types of operations are to be implemented for the pool. Such policies may include, for example, retention period modification implementation policies, software update policies and the like. A retention period modification implementation policy (RMIP) may indicate how the MLS should apply a change (e.g., a reduction or an increase) requested by an authorized administrator or user to a PRP which was saved earlier as a parameter of a warm pool. For example, the RMIP may indicate that the requested change should be applied only to new CIs added to the pool after the change request. Alternatively, an RMIP may indicate that the change should be applied to currently in-use CIs as well, and/or to CIs that are currently in their PRPs (i.e., that a PRP which has already begun for a given instance should be changed based on the request).

A software update policy indicated or selected by an MLS client may, for example, indicate how the MLS should roll out updates to the operating systems or other system software components of the CIs of the pool when such updates become available—e.g., whether all the CIs of a pool are required to run the identical version of system software at all times, or whether the client is willing to accept scenarios in which some of the CIs of the pool are running slightly different versions of system software than others. A software update policy may also indicate whether, prior to updating the system software used at one or more CIs of the warm pool, the MLS should notify an authorized administrator of the pool and/or receive approval of the update in advance from an administrator, and so on. In at least some embodiments, the software update policy in use for a warm pool may enable the MLS to update system software (or other software) at the CIs of the warm pool in response to determining that such an update is available, without receiving a request for the update from an authorized administrator or user. In some embodiments, because applying an update may temporarily reduce the number of available CIs within a given warm pool (e.g., a CI may be updated instead of being used for a new task during its post-task-completion retention period), a software update policy may indicate a reduced billing rate for updated CIs. In various embodiments, some or all of the parameters shown in FIG. 1 may be indicated by an MLS client in a pool establishment request sent via a programmatic interface, and stored in a metadata repository of the MLS. In some embodiments, pool policies 651 may not be included in the set of parameters 601 stored for a given pool.

In one embodiment, instead of specifying a "max-in-use-CIs" upper limit on the number of CIs to which a client-selected PRP is to be applied, a client of an MLS may indicate that a PRP is to be applied to all the CIs used for the client's task requests; that is, an upper limit on the number of concurrently used CIs may not be chosen by the client. In some embodiments, the MLS (or a VCS) may set a limit on the maximum number of compute instances that can be concurrently utilized on behalf of a client account, and such a limit may be used for a warm pool if the request for the warm pool does not indicate a max-in-use-CIs parameter.

Figure 7:
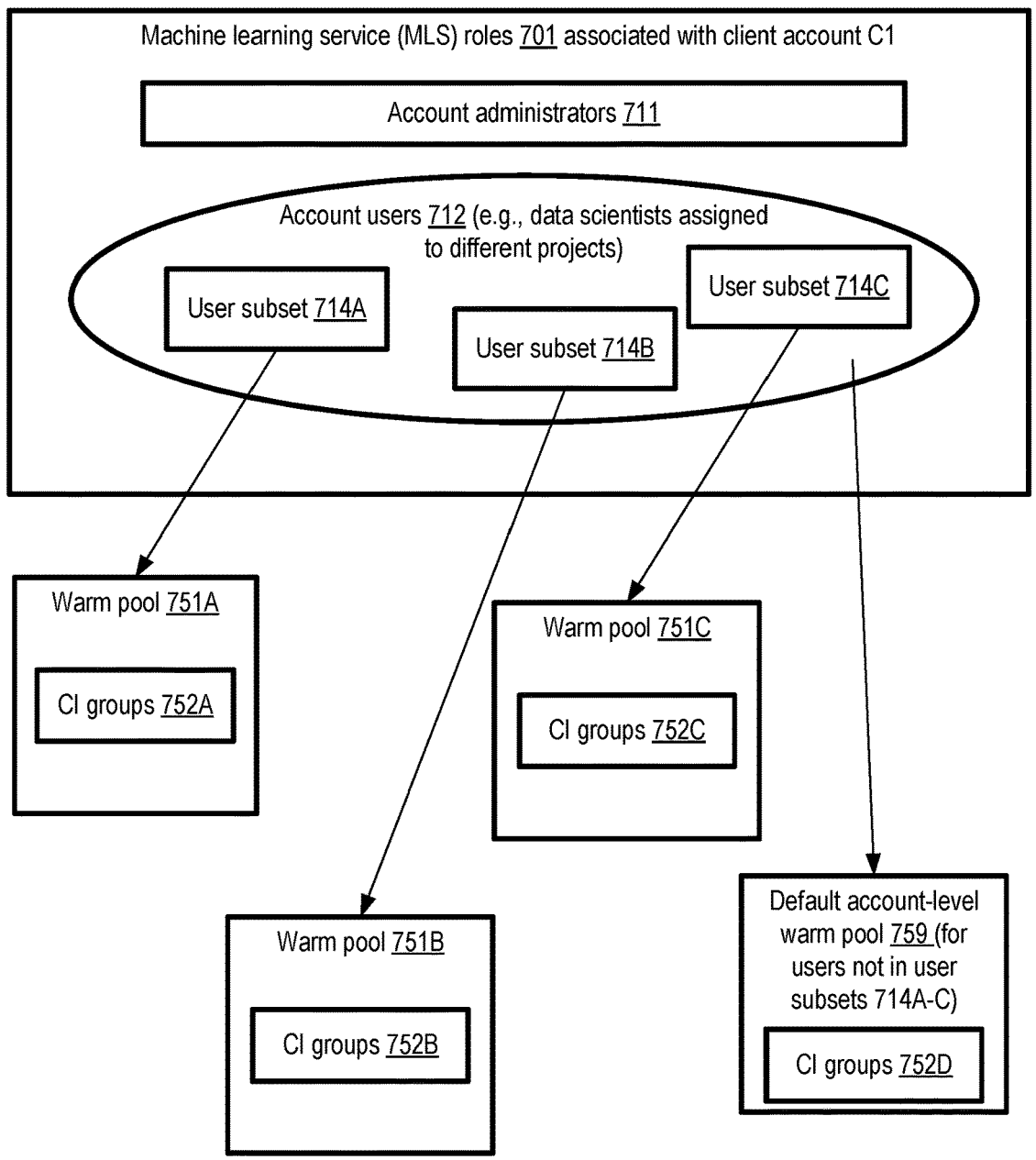
FIG. 7 illustrates an example scenario in which multiple warm pools may be established for respective sets of users associated with a given client account of a machine learning service, according to at least some embodiments.

FIG. 7 illustrates an example scenario in which multiple warm pools may be established for respective sets of users associated with a given client account of a machine learning service, according to at least some embodiments. Client accounts may be set up via programmatic interfaces of the MLS and/or at a provider network at which an MLS is implemented in various embodiments, and such accounts may be used to coordinate billing and other administrative tasks associated with the use of the resources of the MLS and/or other provider network services. In at least some embodiments, multiple users (each with a unique user identifier which is indicated in requests submitted to the MLS) may be associated with a given client account. For example, a set of 100 data scientists belonging to a given organization may all be affiliated with a single client account set up for the organization, and billing for resources utilized on behalf of the 100 data scientists by the MLS may aggregated at the client account level.

In the embodiment shown in FIG. 7, at least two types of MLS roles 701 may be defined for a given client account C1: account administrators 711, and account users 712 (e.g., data scientists who may be assigned to any of several different ML projects at a given point in time). The account administrators 711 may be permitted to set up (and modify the properties of) warm pools of the kind discussed above; as such, they may be designated as authorized administrators of the warm pools (such as the administrators discussed above in the context of FIG. 6).

Account users 712 may be grouped (e.g., by the account administrators) into user subsets such as user subset 714A, user subset 714B and user subset 714C in the depicted embodiment. For example, user subset 714A may comprise data scientists working on a machine learning project P1, user subset 714B may be working on ML projects P2 and P3, and so on.

A respective warm pool of CIs may be set up for one or more of the user subsets 714 in the depicted embodiment by an account administrator. For example, warm pool 751A comprising CI groups 752A (similar to CI groups shown in FIG. 6) may be set up for user subset 714A, warm pool 751B comprising CI groups 752B may be set up for user subset 714B, and warm pool 751C comprising CI groups 752C may be set up for user subset 714C. Some warm pools may, for example, comprise very high-end CIs suitable for training a particular type of ML model such as a large deep neural network of one ML project, while others may comprise CIs with access to a particular type of GPU or a hardware accelerator for certain types of computations needed for another ML project. In addition, in some embodiments, if desired, a default account-level warm pool 759 with CI groups 752D may be set up for users affiliated with the client account who are not currently in user subsets 714A-714C. The MLS may provide various types of metrics (and if desired, billing information) at the per-warm-pool level to account administrators in some embodiments. By allowing user-subset-specific or project-specific warm pools to be set up, the MLS may enable its clients to gain clearer insight into, and potentially optimize, the manner in which MLS resources are utilized for the clients in various embodiments.

Figure 8:
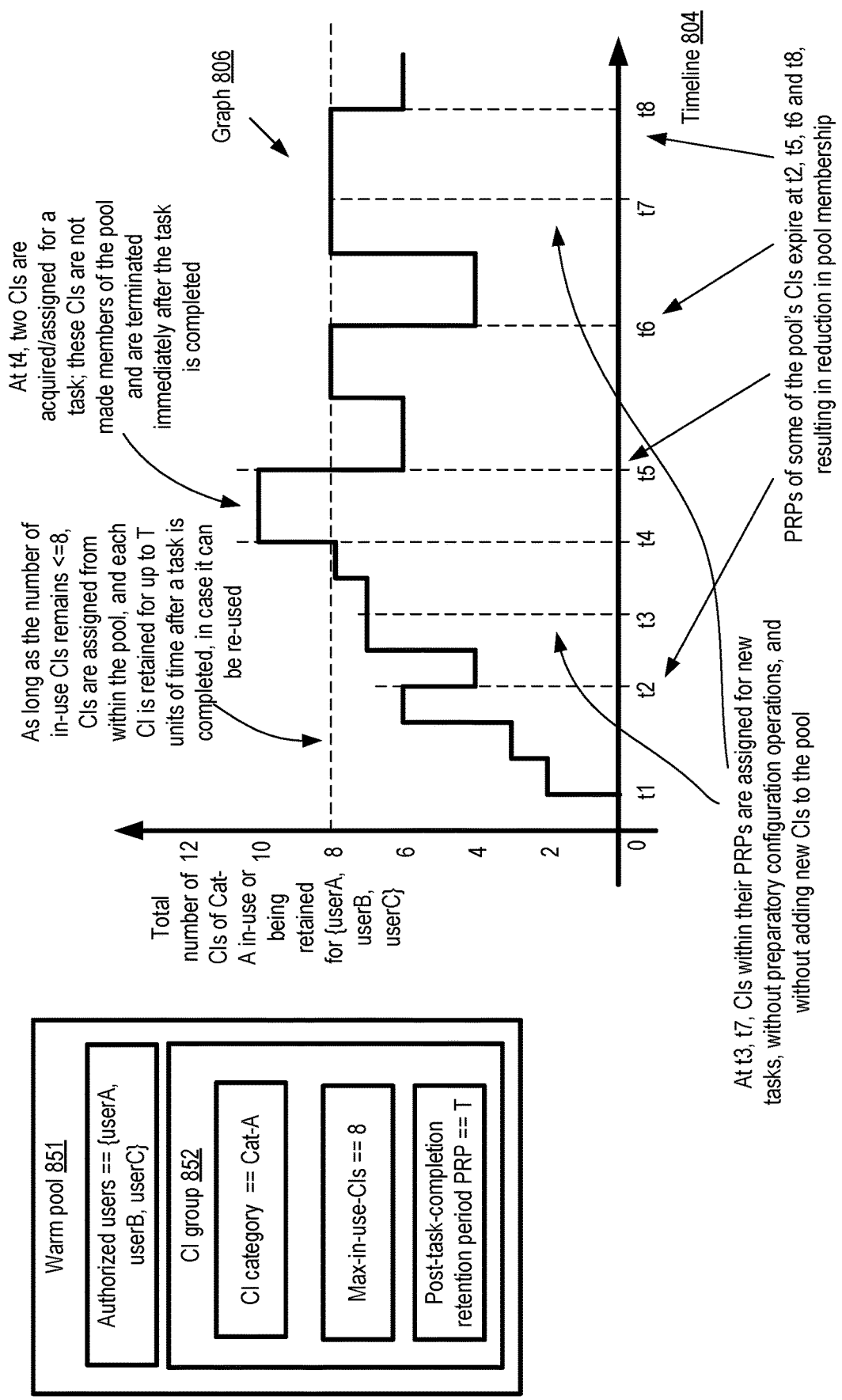
FIG. 8 illustrates example changes over time in the number of compute instances configured within a warm pool, according to at least some embodiments.

FIG. 8 illustrates example changes over time in the number of compute instances configured within a warm pool, according to at least some embodiments. In the simple example scenario shown, a warm pool 851 has been established for machine learning tasks submitted by a set of authorized users userA, userB and userC. Warm pool 851 comprises a compute instance (CI) group 852, within which the maximum number of in-use CIs (max-in-use-CIs) of a CI category Cat-A is set to 8. The post-task completion retention period (PRP) for the CIs of CI group 852 is set to T.

The total number of CIs of category Cat-A that are in-use or retained (i.e., in their post-task-completion retention periods) for use by any of the authorized users is shown along the Y-axis of graph 806 as a function of time along timeline 804. In the embodiment shown in FIG. 8, when warm pool 851 is created at some time before t1 along timeline 804, it does not actually contain any CIs—that is, while the parameters indicating the category and maximum potential count of CIs are stored for the pool, CIs are assigned to the pool only in response to subsequent requests for ML tasks from the pool's authorized users. In other embodiments, a client may request that one or more CIs be launched, configured according to parameters specified in the pool creation request, and included in a warm pool at the time of the creation of the pool.

At time t1 along timeline 804, two CIs are added to the warm pool 851, e.g., in response to receiving an ML task request from one of the authorized users. As long as the number of in-use CIs in warm pool 851 remains below the upper limit of 8, CIs from the pool may be assigned to tasks requested by any of the authorized users. If a CI currently in warm pool 851, whose PRP has started but not yet expired, is available for such a task, that CI is assigned to the task. For example, at times t3 and t7, a CI within its PRP is assigned to a new requested task, without increasing the number of CIs in the pool and without performing at least some preparatory configuration operations of the kind discussed earlier.

If no CI whose PRP has begun is available, but the number of CIs within the pool would not be exceeded by adding another CI to the pool 851 when a new task has to be initiated, another CI may be assigned to the task and added to warm pool 851. Each CI added to the pool is retained for up to T units of time after a task run at the CI completes, in case the CI can be re-used for another task requested by an authorized user of the warm pool.

The PRPs of some of the CIs of warm pool 851 expire at times t2, t5, t6 and t8. The expired CIs are terminated, resulting in a reduction in the number of CIs currently designated as members of warm pool 851 at (or shortly after) the expirations.

At time t4, one or more of the authorized users submits a task request which requires 2 CIs of category Cat-A, at a time when the number of CIs that are in use for ML tasks (and whose PRPs have therefore not started) is equal to 8 (the maximum in user permitted within the pool 851). Accordingly, in the embodiment depicted in FIG. 8, two CIs are acquired/assigned for the task but not made members of the warm pool. The task is run at the CIs after preparatory configuration operations are performed, and the CIs are terminated immediately after the task is completed, e.g., at t5, without waiting for a PRP to expire. Thus, setting up a warm pool such as pool 851 may not necessarily prevent the authorized users indicated for the pool to utilize more CIs concurrently than the max-in-use-CIs parameter of the pool in at least some embodiments; however, the excess CIs (assigned after the max-in-use-CIs count has been reached) may not be retained for potential re-use. In at least one embodiment, instead of immediately terminating the specific CIs that were acquired outside the pool when the tasks running at those instances end, the MLS may identify CIs inside the pool that have been running for longer and are currently in their retention periods, terminate those longer-running in-pool CIs, and add the specific CIs to the pool in place of the in-pool CIs. This approach may have the benefit of keeping more recently launched CIs in the pool in preference to older CIs. In other embodiments, a client account administrator may indicate, e.g., in a pool establishment request, that once the max-in-use-CIs limit is reached, no more CIs of the categories indicated in the pool parameters should be assigned to the authorized users of the pool.

Figure 9:
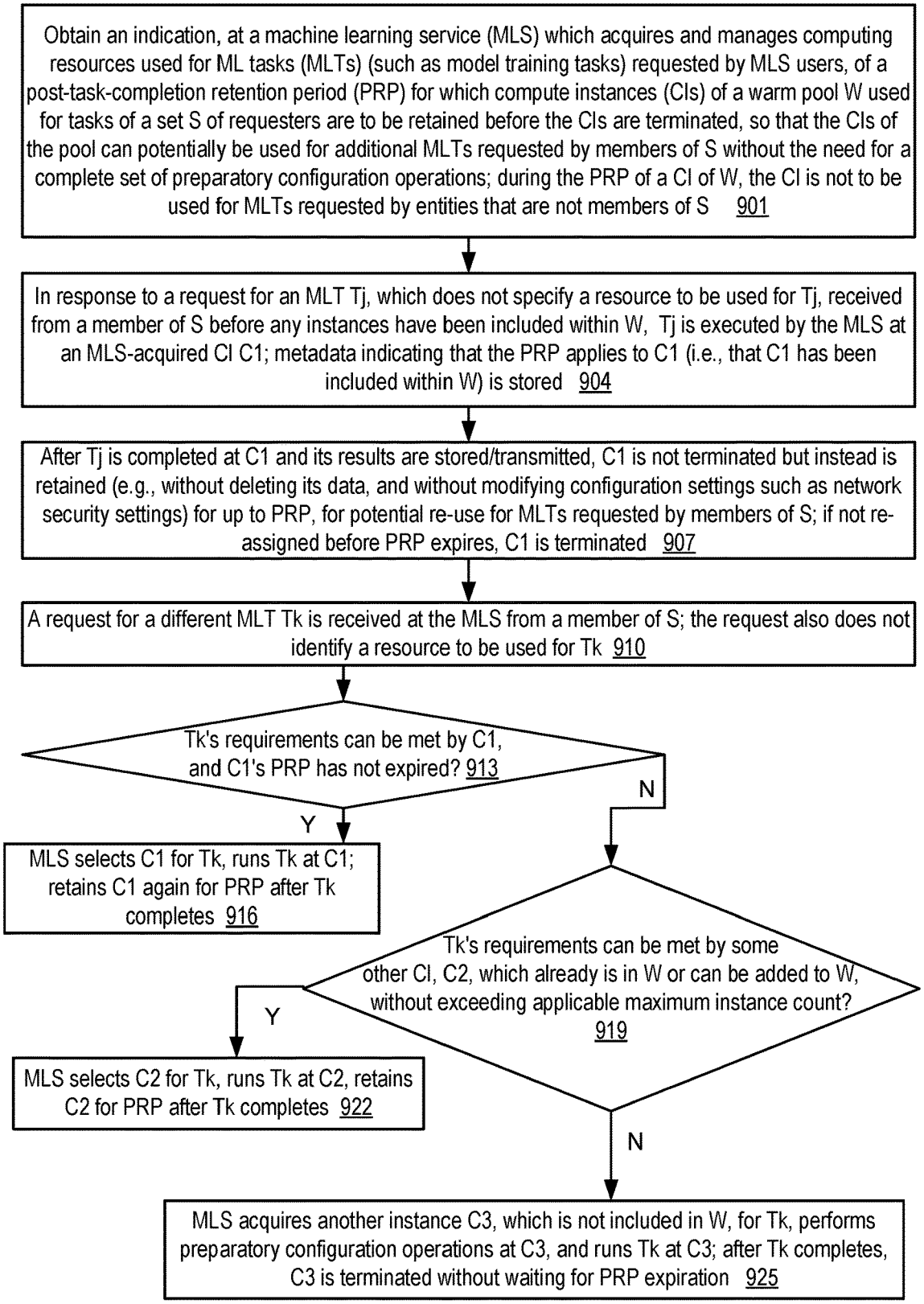
FIG. 9 is a flow diagram illustrating aspects of operations that may be performed at a machine learning service to assign compute instances to machine learning tasks, according to at least some embodiments.

FIG. 9 is a flow diagram illustrating aspects of operations that may be performed at a machine learning service to assign compute instances to machine learning tasks, according to at least some embodiments. As shown in element 901, an indication of a post-task-completion retention period (PRP) for which compute instances of a warm pool W used for machine learning tasks (MLTs) (such as model training tasks) requested by members of a set S of requesters are to be retained before the CIs are terminated may be obtained at a machine learning service (MLS). The MLS, similar in features and functionality to MLS 102 of FIG. 1, may be responsible for acquiring and managing CIs and other computing resources for MLTs requested by its clients/users in the depicted embodiment. The CIs of pool W may be retained for their PRPs so that they can potentially be used for additional MLTs requested by members of S without the need for a complete set of preparatory configuration operations which would have been required had new CIs been launched for the MLTs instead. During a PRP of a CI of W, the CI may not be used for tasks requested by entities that are not members of S in the depicted embodiment.

In response to a task request for an MLT Tj, which does not specify a computing resource or CI to be used for Tj, received at the MLS from a member of S before any instances have been included within W, the execution of Tj may be coordinated by the MLS at an MLS-acquired CI, C1 (element 904) in the embodiment shown in FIG. 9. Metadata indicating that the PRP of W applies to C1 (i.e., that C1 has been added as a member of W) may be stored by the MLS.

After Tj is completed at C1 and its results are stored/transmitted to the appropriate destinations, C1 is not terminated (element 907). Instead, C1 remains running for up to PRP units of time, without deleting data stored at C1 for the execution of Tj, and without modifying configuration settings of C1 including network security settings in the depicted embodiment, to enable potential re-use of C1 for MLTs requested by members of S. If not re-assigned or re-used before its PRP expires, C1 may be terminated.

A request for a new or different MLT Tk may be received at the MLS from a member of S (element 910). This request may also not specify a computing resource to be used for Tk. If Tk's requirements can be met by C1, and C1's PRP has not expired yet (as determined in operation corresponding to element 913), the MLS may assign C1 to Tk, and cause Tk to be run at C1; after Tk completes, C1 may again be retained for up to the PRP (element 916).

If C1 has been terminated or cannot satisfy the requirements of Tk, as also determined in operations corresponding to element 913, the MLS may try to ascertain whether some other CI of W can be used instead. If Tk's requirements can be met some other CI C2 which already is in W or can be added to W, without exceeding the applicable maximum limit on the count of CIs within W (as determined in operations corresponding to element 919), the MLS may select C2 for Tk, run Tk at C2, and retain C2 for the PRP after Tk completes (element 922) in the depicted embodiment.

If W's CIs cannot be used for Tk, as also determined in operations corresponding to element 919, the MLS may acquire another instance C3, which is not designated as a member of W, for Tk (element 925) in at least some embodiments. Such a use of a non-pool CI may be initiated, for example, in response to detecting that the number of in-use CIs within W satisfies the maximum limit criterion defined for W. Any needed preparatory configuration operations may be performed for C3, and Tk may be run at C3. After Tk completes, C3 may be terminated without waiting for PRP expiration in the depicted embodiment.

FIG. 10 is a flow diagram illustrating aspects of operations that may be performed at a machine learning service to provide notifications associated with post-task-completion retention periods, according to at least some embodiments. As shown in element 1001, one or more authorized entities (e.g., users on whose behalf ML tasks from a warm pool W1 are to be run) associated with a client account of an MLS, may opt in to receive notifications associated with task completions at W1's CIs, such as notifications of impending task completion and retention period (PRP) initiations, notifications of imminent expirations of retention periods, etc. Programmatic interfaces implemented by the MLS may be used for opting in for such notifications in various embodiments, and for specifying the particular notification mechanisms to be used (e.g., text messages, e-mails, etc.). The opt-in information may be stored as part of W1's metadata in some embodiments.

The MLS may detect, e.g., using interfaces or features of the particular machine learning framework being used, that an ML task implemented at a particular CI of W1 is about to be completed (element 1004) in the depicted embodiment. If an entity has opted in to receive advance notifications of ML task completion, the MLS may identify the entity or entities from the pool's metadata, and transmit such notifications in some embodiments (element 1007), e.g., to give the entities some time to decide on whether tasks that are compatible with that CI should be requested.

If an entity has opted in to receive advance notifications of retention period expirations, and a time threshold is reached during the retention period (e.g., 50% of the PRP of a CI is complete) without receiving a task request that can be fulfilled using the CI, the MLS may identify the entity or entities and transmits such notifications (element 1010) in at least one embodiment. Multiple such notifications may be transmitted at different stages of the retention period based on configurable parameters in some embodiments, giving the entities opportunities to take advantage of the reduction in preparatory configuration operation delays before the retention period expires and the CI is terminated.

FIG. 11 is a flow diagram illustrating aspects of operations that may be performed at a machine learning service to generate recommendations for warm pool parameter settings, according to at least some embodiments. One or more authorized entities associated with a client account of an MLS may opt in to permit the MLS to collect and analyze metrics/statistics associated with the execution of ML tasks at MLS-selected resources on behalf of the entity (element 1101). Programmatic interfaces implemented by the MLS may be used for opting in for such analysis in various embodiments. The opt-in information may be stored as part of the client account's metadata in some embodiments.

The MLS may collect data on tasks executed on behalf of the entity for some period of time (e.g., using computing resources that are configured within warm pools set up on behalf of the client, using computing resources that are not part of warm pools, or using either type of resource) (element 1104). The MLS may analyze the collected data, e.g., using one or more demand forecasting models or other machine learning models, and determine recommended warm pool configuration settings for the entity in the depicted embodiment (element 1107). The recommendations may be for additional warm pools, or for changes to the parameters of existing warm pools, for example. Examples of the recommended configuration settings may include recommended ranges or values for post-task-completion retention periods, recommended categories of computing resources to be included in a pool, recommended limits on the maximum number of computing resources of a particular category to be included in a pool, identifiers of a set of authorized users for which a pool should be created, and so on. The recommended settings may then be communicated to the entity (element 1110) from the MLS in the depicted embodiment.

Figure 12:
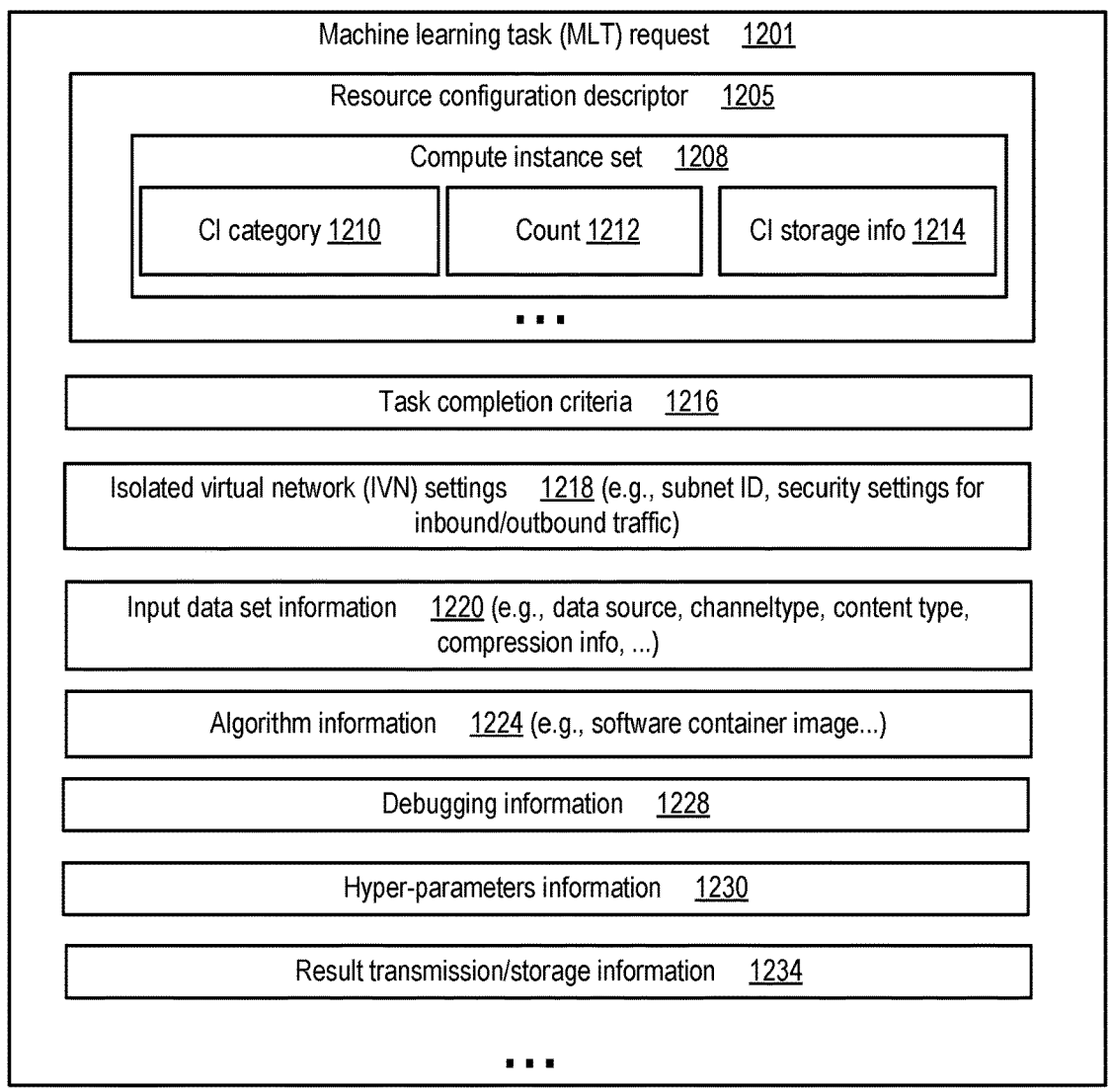
FIG. 12 illustrates example parameters of a machine learning task request which may be submitted to a machine learning service, according to at least some embodiments.

FIG. 12 illustrates example parameters of a machine learning task request which may be submitted to a machine learning service, according to at least some embodiments. Machine learning task (MLT) request 1201 may comprise a resource configuration descriptor 1205 in the depicted embodiment, which indicates properties of one or more compute instance sets 1208 that are needed for the task. A given compute instance set 1208 may indicate a count 1212 of CIs of a specified CI category 1210 required for the task, as well as details of the storage requirements of the CIs (CI storage info 1214). The storage information may, for example, indicate a key to be used to encrypt data on a storage volume assigned to a CI, the size of the volume, and so on. The count 1212 may be set to a value greater than one if multiple CIs of the same CI category are going to be used in parallel, for example to implement a parallel model training algorithm. For some types of complex multi-stage machine learning tasks, multiple compute instance sets 1208 may be indicated in the task request.

Task completion criteria 1216 may be indicated in an MLT request 1201 to indicate how the MLS is to determine that a task has completed in the depicted embodiment, so that for example the PRP of the CI used for the task can be initiated or the CI can be de-activated or terminated. In some cases, the task completion criterion may be specified simply as a total amount of time (e.g., for a model training task). In other cases, the requester of the task may indicate some other signal (e.g., a file to which a write is performed by the task's algorithm when the task is complete) that can be used to detect when a task is complete. In at least some embodiments, the machine learning framework (e.g., a framework similar to Keras, PyTorch, SparkML etc.) being utilized for the task may provide APIs that can be used to indicate or detect task completion.

In some embodiments the CIs used for an MLT may be configured within isolated virtual networks (IVNs) of a VCS of a provider network. Details of the IVN settings 1218 of the CIs to be used for the ML may include, for example a subnet identifier of a subnet within which the CIs are to be configured, security settings such as firewall settings for inbound and outbound network traffic from the CIs, and so on in the depicted embodiment.

Input data set information 1220 for the MLT may include indications of one or more data sources from which data sets are to be accessed for the MLT, the type of channel (e.g., whether streaming data channels are to be used, or static files are to be used) to be used for the input, the content type (e.g., images, text documents, video, multi-modal content), whether compression is to be used to transfer the input data sets (and if so the compression algorithm to be used), whether encryption is to be used to transfer the input data sets (and if so the encryption algorithm and key to be used), and so on.

Algorithm information 1224 may identify a software container image to be used to execute the algorithm utilized by the MLT in some embodiments. Definitions of metrics to be extracted from logs generated by the algorithm may also be included in the algorithm information in at least one embodiment.

In some embodiments, information about debugging 1228 may be included in the MLT request 1201, such as the names of log files and/or logged event identifiers that can be extracted by the MLS to enable investigation of the status of the task. Some clients may provide hyper-parameters information 1230 for the task, such as values or ranges of specific hyper-parameters to be used during the task. Result transmission/storage information 1234 may indicate storage locations (e.g., an identifier of a storage object at a storage service of the provider network) or network destinations (e.g., data sources for downstream MLTs) to which results of the MLT should be sent in some embodiments.

The MLS may utilize various parameters of an MLT request 1201 to coordinate or orchestrate the execution of the MLT in the depicted embodiment. For example, the resource configuration descriptor 1205 may be used (along with the identity of the requester) to determine whether CIs from a warm pool can be used for the requested task, the IVN settings may be used to determine whether a CI from a warm pool already has the appropriate networking and security settings for the task, the task completion criteria may be used to start PRPs and/or to provide notifications about impending PRP starts/ends, the input data set information may be used to ascertain whether input data has to be downloaded or the set of input data (of a previous MLT) already stored at a CI of a warm pool can be re-used, the algorithm information may be used to ascertain whether a new container image has to be downloaded or the container image (of a previous MLT) already stored at a CI of a warm pool can be re-used, and so on.

Figure 13:
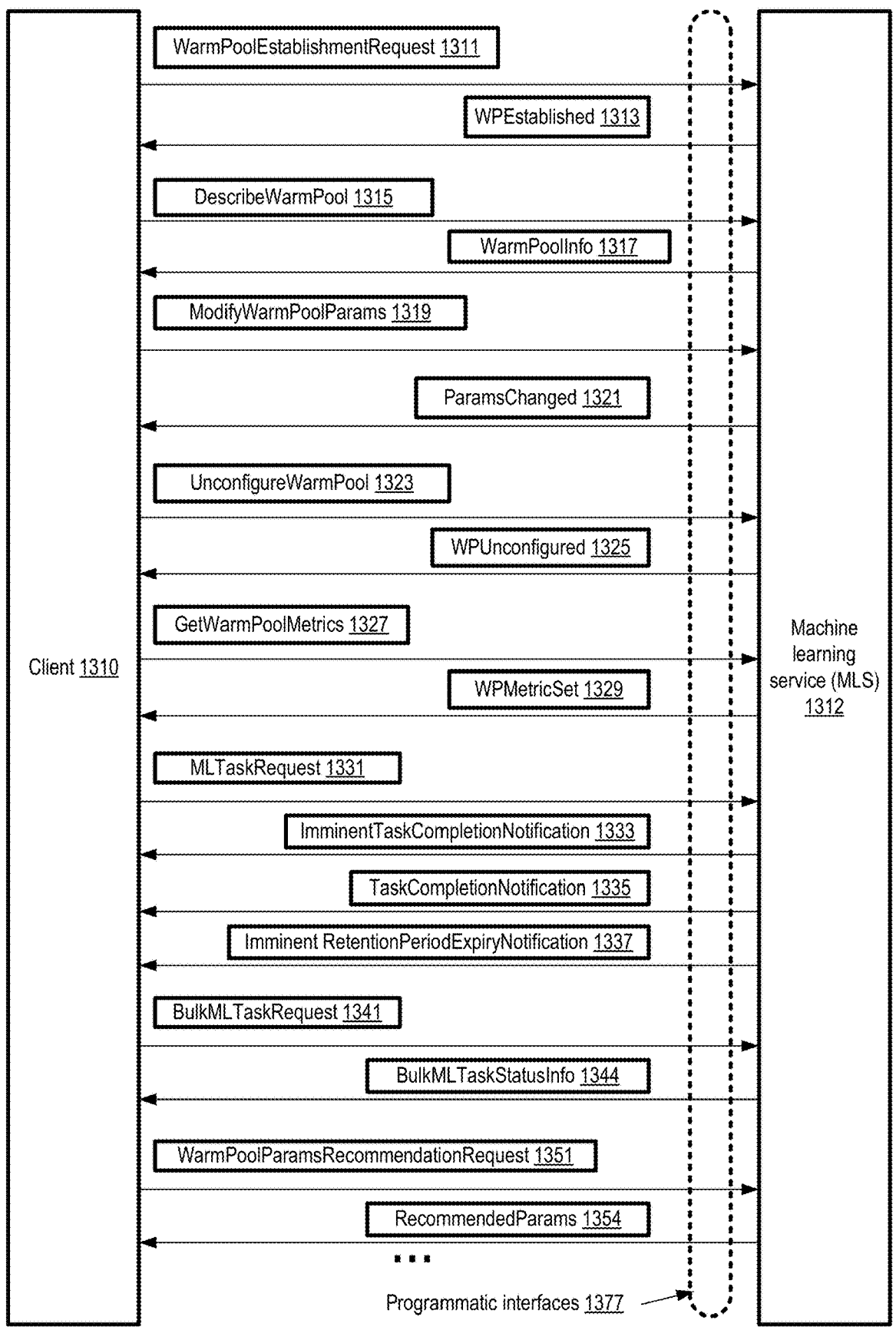
FIG. 13 illustrates example programmatic interactions between clients and a machine learning service, according to at least some embodiments.

FIG. 13 illustrates example programmatic interactions between clients and a machine learning service, according to at least some embodiments. In the embodiment depicted in FIG. 13, a machine learning service (MLS) 1312, similar in features and functionality to MLS 102 of FIG. 1, may implement a set of programmatic interfaces 1377, such as a web-based console, command-line tools, graphical user interfaces, APIs, and the like. Clients 1310 of the MLS, such as administrators associated with client accounts, or users on whose behalf machine learning tasks are to be run, may submit various types of requests and messages to the MLS via the programmatic interfaces 1377, and receive corresponding responses.

A client 1310 may, for example, submit a resource pool setup request such as WarmPoolEstablishmentRequest 1311, indicating various parameters of a warm pool of computing resources (e.g., CIs) to be set up for a set of users (such as the parameters shown in FIG. 6). The parameters may be stored as part of a pool metadata store of the MLS, and a WPEstablished message 1313 may be sent to the client in the depicted embodiment. Note that at least in some embodiments, while the parameters of a requested warm pool may be stored in response to the pool establishment request, computing resources may not actually be launched and assigned to the pool at the time of the establishment. In other embodiments a pool establishment request may include a parameter (such as a ConfigureCIsOnPoolEstablishment parameter) indicating that some number of CIs of the indicated CI categories should be launched and added to the pool at the time that the pool is established, in which case the MLS may proactively instantiate CIs accordingly.

A client may submit a DescribeWarmPool request 1315 to view details of one or more warm pools that have been set up earlier for the client in some embodiments. The parameters of the established pools may be provided to the client via one or more WarmPoolInfo messages 1317 in the depicted embodiment.

A Modify WarmPoolParams request 1319 may be use to change one or more parameters of a warm pool that was created earlier in some embodiments. Such parameter changes may include, among others, changes to the categories of computing resources to be included in the pool, changes to the upper limits on the count of in-use resources of the pool, changes to the post-task-completion retention periods, changes to the set of authorized users or authorized administrators, changes to software update policies or retention period modification policies, and so on. After verifying that the client is authorized to make the requested changes, the MLS may store metadata indicating the changed parameters, and send a ParamsChanged response 1321 to the client in at least one embodiment. Subsequent to the changing of the parameters, the modified versions of the parameters (e.g., a modified version of the retention period, the modified version of the upper limit on the count of resources of the pool, etc.) may be used to satisfy or fulfill newly-received task requests.

A client may submit an UnconfigureWarmPool request 1323 if a warm pool is no longer needed in the depicted embodiment. In response, metadata pertaining to the warm pool may be deleted from the repositories of the MLS, and a WPUnconfigured message 1325 may be sent to the client in some embodiments.

The MLS may collect a variety of metrics associated with warm pools if the client requesting the creation or modification of the pool grants permission in various embodiments, such as the total number of times that CIs were re-used instead of being terminated or de-activated, the total number of times that the number of in-use CIs of a pool was equal to the maximum in-use count when a task request from an authorized user of a pool was received (and as a result the total number of times that CIs outside the pool had to be used), and so on. A client may request such metrics by submitting a GetWarmPoolMetrics request 1327 in the depicted embodiment. The metrics may be provided in one or more WPMetricSet messages 1329.

Requests for individual machine learning tasks, such as tasks to train or run machine learning models, or tasks to perform pre-processing on data sets, may be submitted by clients via MLTaskRequest messages 1331 in the depicted embodiment. Values of parameters such as those shown in FIG. 12 may be included in the task requests. In response, the MLS may identify or acquire one or more computing resources (such as CIs) that can satisfy the requirements of the requested task (e.g., from a warm pool if possible), coordinate any preparatory configuration operations which may be needed, and initiate the execution of the task in various embodiments. If the client has opted in to be notified regarding imminent task completion, the MLS may send one or more ImminentTaskCompletionNotification messages 1333 to the client in the depicted embodiment as the task nears completion. When the task completes, its results (or an indication that the task has completed) may be sent to the client via a TaskCompletionNotification message 1335 in some embodiments. If the task was performed using a resource of a warm pool, and if the client had opted in to receive notifications of impending expiration of post-task-completion retention periods, one or more ImminentRetentionPeriodExpiryNotification messages 1337 may be sent to the client in the depicted embodiment.

Instead of sending requests for individual ML tasks, a client may submit a BulkMLTaskRequest message 1341 in some embodiments, which comprises a multi-task descriptor indicating respective properties/requirements of multiple tasks which may have to be run on behalf of the client. Warm pool resources may be used for at least some of the tasks by the MLS if such pools have been set up and can satisfy the tasks' requirements. In some cases, the BulkMLTaskRequest may indicate dependencies or parallelism opportunities with respect to the tasks—e.g., that task B should be run after task A completes, that task C and task D can be run in parallel after task B completes, etc. The MLS may coordinate the execution of the tasks indicated in the BulkMLTaskRequest, and send one or more BulkMLTaskStatusInfo messages 1344 to the client indicating the progress of execution of the set of tasks indicated in the request—e.g., how many tasks have completed, which tasks are currently underway, which tasks are pending, etc.

If a client had opted in to allow the MLS to analyze metrics of ML task execution and generate recommendations for warm pool parameter settings, the client may send one or more WarmPoolParamsRecommendationRequest messages 1351 to obtain such recommendations in the depicted embodiment. If the MLS has generated recommendations for changing parameters of existing warm pools, and/or recommendations for parameters of new warm pools, the recommendations may be provided in the depicted embodiment via one or more RecommendedParams messages 1354.

In some embodiments, warm pool related programmatic interactions other than those shown in FIG. 13 may be supported by an MLS 1312. For example, clients may submit requests or messages to opt-in for notifications of impending task completions, opt-in for notifications of impending starts or ends of PRPs, and/or opt-in for receiving warm pool configuration settings recommendations via programmatic interfaces of the MLS in at least one embodiment.

Figure 14:
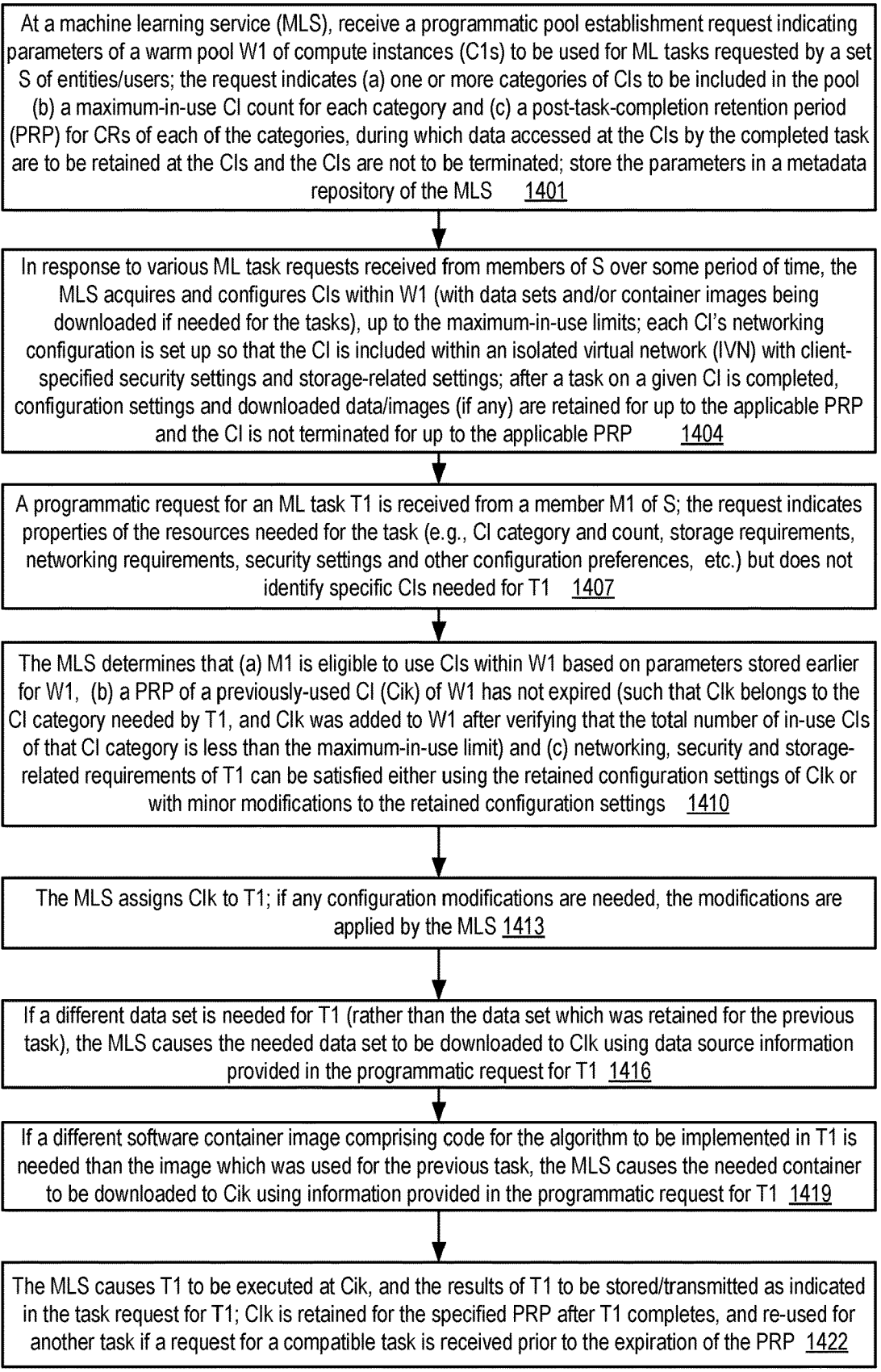
FIG. 14 is a flow diagram illustrating aspects of operations that may be performed at a machine learning service to select compute instances from within a warm pool for a particular machine learning task request, according to at least some embodiments.

FIG. 14 is a flow diagram illustrating aspects of operations that may be performed at a machine learning service to select compute instances from within a warm pool for a particular machine learning task request, according to at least some embodiments. As shown in element 1401, a programmatic pool establishment request indicating parameters of a warm pool W1 of compute instances (CIs) to be used for ML tasks requested by a set S of entities/users may be received at a machine learning service similar to MLS 102 of FIG. 1. The request may indicate (a) one or more categories of CIs to be included in the pool (b) a maximum-in-use CI count for each category and (c) a post-task-completion retention period (PRP) for CRs of each of the categories, during which data accessed at the CIs by the completed task (e.g., including input data sets, software containers etc.) are to be retained at the CIs instead of being deleted, and the CIs are not to be terminated. The parameters may be stored in a metadata repository of the MLS in the depicted embodiment.

In response to various ML task requests received from members of S over some period of time, the MLS may acquire and configures CIs within W1 (with data sets being downloaded if needed for the tasks, and/or container images with algorithm code being downloaded if needed), up to the maximum-in-use limits (element 1404) in various embodiments. Each CI's networking configuration may be set up so that the CI is included within an isolated virtual network (IVN) with client-specified security settings and storage-related settings. After a task on a given CI is completed, configuration settings, container images and downloaded data sets (if any) may be retained for up to the applicable PRP and the CI may not be terminated for up to the applicable PRP.

A programmatic request for an ML task T1 may be received at the MLS from a member M1 of S (element 1407) in the depicted embodiment. The request may indicate various properties of the resources and preferred configuration settings needed for the task (e.g., CI category and count, storage requirements, networking requirements, security settings, and/or other configuration preferences) but may not identify specific CIs needed for T1.

The MLS may attempt to determine whether a CI from W1 qualifies for T1 in various embodiments. For example, as shown in element 1410, the MLS may determine, that (a) M1 is eligible to use CIs within W1 based on parameters stored earlier for W1, (b) the total number of in-use CIs of the CI category required by T1 would not be exceeded if a CI from W1 is assigned to T1 (c) a PRP of a previously-used CI CIK of W1, of a category required for T1, has not expired, (d) networking, security and storage-related requirements of T1 can be satisfied either using the retained configuration settings or with minor modifications to the retained configuration settings.

The MLS may assign CIk to T1; if any configuration modifications are needed, the modifications may be applied by the MLS in at least some embodiments (element 1413). If a different data set is needed for T1 (rather than the data set which was retained from the previous task), the MLS may cause the needed data set to be downloaded to CIk using data source information provided in the programmatic request for T1 in some embodiments (element 1416). If a different software container image comprising code for the algorithm to be implemented in T1 is needed than the image which was used for the previous task, the MLS may cause the needed container to be downloaded to CIk using information provided in the programmatic request for T1 in at least one embodiment (element 1419).

The MLS may cause T1 to be executed at CIk, and the results of T1 to be stored/transmitted as indicated in the task request for T1 in various embodiments (element 1422). CIk may be retained for the specified PRP after T1 completes, and re-used for another task if a request for a compatible task is received prior to the expiration of the PRP in at least some embodiments.

It is noted that in various embodiments, some of the operations shown in FIG. 9, FIG. 10, FIG. 11 and/or FIG. 14 may be implemented in a different order than that shown in the figure, or may be performed in parallel rather than sequentially. Additionally, some of the operations shown in 9, FIG. 10, FIG. 11 and/or FIG. 14 may not be required in one or more implementations.

Figure 15:
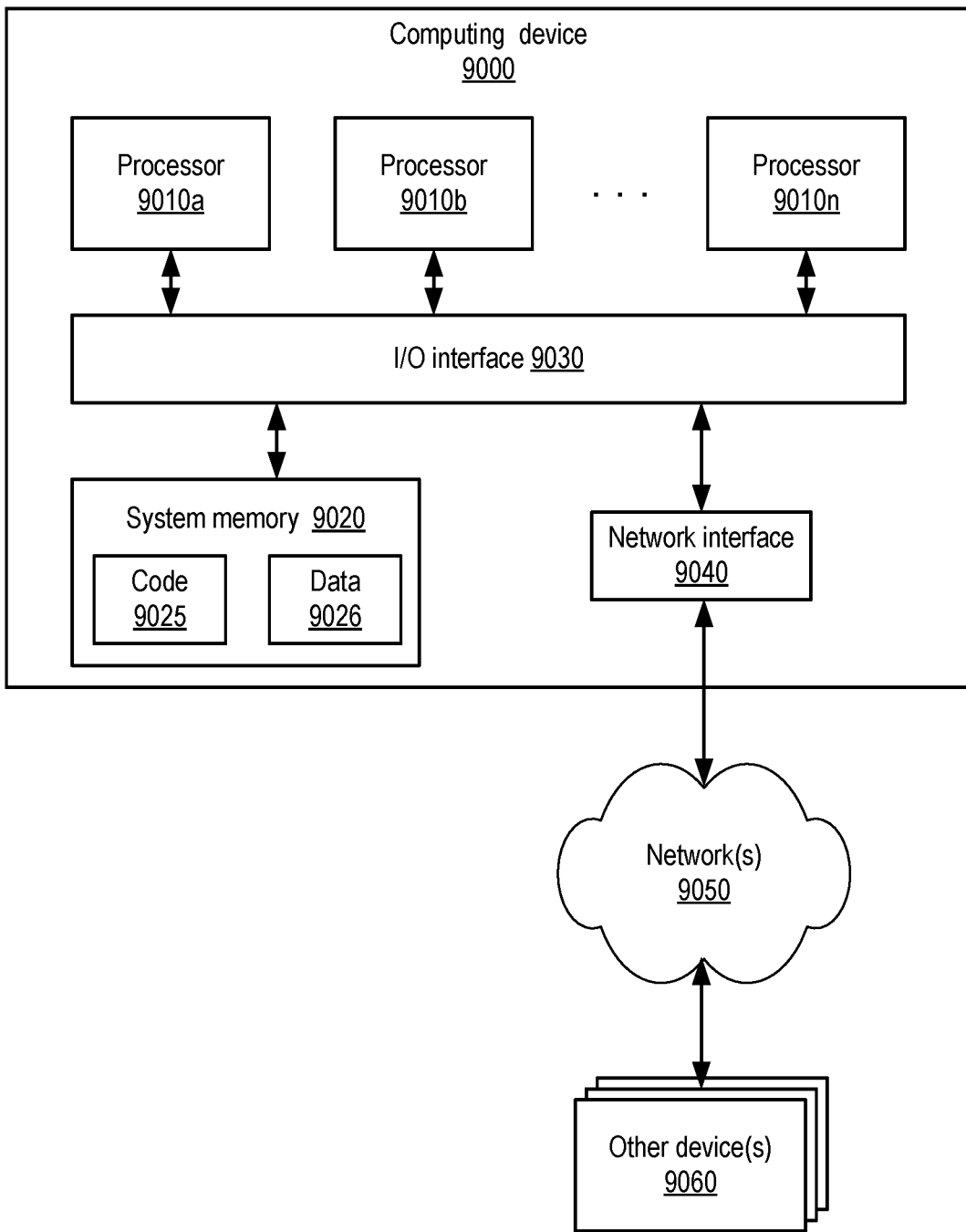
FIG. 15 is a block diagram illustrating an example computing device that may be used in at least some embodiments.

In at least some embodiments, a server that implements the types of techniques described herein (e.g., various functions of an MLS, VCS, or other services of a provider network), may include a general-purpose computer system that includes or is configured to access one or more computer-accessible media. FIG. 15 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 14, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 14. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
    performing, at a cloud computing environment, respective operations of one or more categories of preparatory operations prior to executing, at a particular computing resource, a first machine learning task on behalf of a client, wherein the first machine learning task is executed at the particular computing resource without receiving input from the client specifying that the particular computing resource is to be used for the first machine learning task;
    providing, from the cloud computing environment to the client, an indication that the particular computing resource is available for re-use for a first time interval after completion of the first machine learning task; and
    in response to determining, at the cloud computing environment, that a result of a particular operation of the respective operations can be re-used for a second machine learning task, wherein the second machine learning task is requested by the client prior to expiration of the first time interval, and wherein the particular operation belongs to a first category of the one or more categories, executing the second machine learning task at the particular computing resource without performing an operation of the first category for the second machine learning task.

2. The computer-implemented method as recited in claim 1, wherein the particular operation comprises one or more of: (a) a networking configuration operation or (b) a security configuration operation.

3. The computer-implemented method as recited in claim 1, wherein the particular computing resource comprises a compute instance of a virtualized computing service, and wherein the particular operation comprises launching the compute instance.

4. The computer-implemented method as recited in claim 1, wherein the particular operation comprises downloading one or more of: (a) a machine learning data set or (b) a software container.

5. The computer-implemented method as recited in claim 1, further comprising:
    obtaining, from the client via one or more programmatic interfaces at the cloud computing environment, an indication of a retention period for which computing resources are to be retained on behalf of the client after completion of machine learning tasks using the computing resources, wherein the first time interval is based at least in part on the retention period.

6. The computer-implemented method as recited in claim 1, wherein the first machine learning task comprises training of a machine learning model.

7. The computer-implemented method as recited in claim 6, wherein the second machine learning task comprises re-training of the machine learning model.

8. A system, comprising:
    one or more computing devices;
    wherein the one or more computing devices include instructions that upon execution on or across the one or more computing devices:
        perform, at a cloud computing environment, respective operations of one or more categories of preparatory operations prior to executing, at a particular computing resource, a first machine learning task on behalf of a client, wherein the first machine learning task is executed at the particular computing resource without receiving input from the client specifying that the particular computing resource is to be used for the first machine learning task;
        provide, from the cloud computing environment to the client, an indication that the particular computing resource is available for re-use for a first time interval after completion of the first machine learning task; and
        in response to a determination, at the cloud computing environment, that a result of a particular operation of the respective operations can be re-used for a second machine learning task, wherein the second machine learning task is requested by the client prior to expiration of the first time interval, and wherein the particular operation belongs to a first category of the one or more categories, execute the second machine learning task at the particular computing resource without performing an operation of the first category for the second machine learning task.

9. The system as recited in claim 8, wherein the particular operation comprises one or more of: (a) a networking configuration operation or (b) a security configuration operation.

10. The system as recited in claim 8, wherein the particular computing resource comprises a compute instance of a virtualized computing service, and wherein the particular operation comprises launching the compute instance.

11. The system as recited in claim 8, wherein the particular operation comprises downloading one or more of: (a) a machine learning data set or (b) a software container.

12. The system as recited in claim 8, wherein the one or more computing devices include further instructions that upon execution on or across the one or more computing devices:
  obtain, from the client via one or more programmatic interfaces at the cloud computing environment, an indication of a retention period for which computing resources are to be retained on behalf of the client after completion of machine learning tasks using the computing resources, wherein the first time interval is based at least in part on the retention period.

13. The system as recited in claim 8, wherein the first machine learning task comprises training of a machine learning model.

14. The system as recited in claim 13, wherein the second machine learning task comprises re-training of the machine learning model.

15. One or more non-transitory computer-accessible storage media storing program instructions that when executed on or across one or more processors:
  perform, at a cloud computing environment, respective operations of one or more categories of preparatory operations prior to executing, at a particular computing resource, a first machine learning task on behalf of a client, wherein the first machine learning task is executed at the particular computing resource without receiving input from the client specifying that the particular computing resource is to be used for the first machine learning task;
  provide, from the cloud computing environment to the client, an indication that the particular computing resource is available for re-use for a first time interval after completion of the first machine learning task; and
  in response to a determination, at the cloud computing environment, that a result of a particular operation of the respective operations can be re-used for a second machine learning task, wherein the second machine learning task is requested by the client prior to expiration of the first time interval, and wherein the particular operation belongs to a first category of the one or more categories, execute the second machine learning task at the particular computing resource without performing an operation of the first category for the second machine learning task.

16. The one or more non-transitory computer-accessible storage media as recited in claim 15, wherein the particular operation comprises one or more of: (a) a networking configuration operation or (b) a security configuration operation.

17. The one or more non-transitory computer-accessible storage media as recited in claim 15, wherein the particular computing resource comprises a compute instance of a virtualized computing service, and wherein the particular operation comprises launching the compute instance.

18. The one or more non-transitory computer-accessible storage media as recited in claim 15, wherein the particular operation comprises downloading one or more of: (a) a machine learning data set or (b) a software container.

19. The one or more non-transitory computer-accessible storage media as recited in claim 15, storing further program instructions that when executed on or across the one or more processors:
  obtain, from the client via one or more programmatic interfaces at the cloud computing environment, an indication of a retention period for which computing resources are to be retained on behalf of the client after completion of machine learning tasks using the computing resources, wherein the first time interval is based at least in part on the retention period.

20. The one or more non-transitory computer-accessible storage media as recited in claim 15, wherein the first machine learning task comprises training of a machine learning model.

* * * * *